United States Patent
Itou et al.

(10) Patent No.: US 8,098,356 B2
(45) Date of Patent: Jan. 17, 2012

(54) LIQUID CRYSTAL DISPLAY DEVICE

(75) Inventors: Osamu Itou, Hitachi (JP); Masateru Morimoto, Chiba (JP); Junji Tanno, Chiba (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 199 days.

(21) Appl. No.: 12/419,411

(22) Filed: Apr. 7, 2009

(65) Prior Publication Data
US 2009/0251654 A1    Oct. 8, 2009

(30) Foreign Application Priority Data
Apr. 8, 2008  (JP) .................... 2008-099986

(51) Int. Cl.
G02F 1/133    (2006.01)
G02F 1/1333   (2006.01)
G02F 1/1335   (2006.01)
G02F 1/1337   (2006.01)
G02F 1/1343   (2006.01)

(52) U.S. Cl. ............ 349/141; 349/33; 349/96; 349/132; 349/138

(58) Field of Classification Search .......... 349/141, 349/33, 96, 132, 138
See application file for complete search history.

(56) References Cited

U.S. PATENT DOCUMENTS

| | | | | |
|---|---|---|---|---|
| 2002/0008828 A1* | 1/2002 | Park et al. | ...................... | 349/141 |
| 2002/0154262 A1* | 10/2002 | Yamakita et al. | ............. | 349/141 |
| 2004/0100607 A1* | 5/2004 | Kawata et al. | ................ | 349/141 |
| 2007/0024789 A1* | 2/2007 | Itou et al. | ...................... | 349/139 |

FOREIGN PATENT DOCUMENTS
JP    2002-296611    10/2002

* cited by examiner

*Primary Examiner* — Mark Robinson
*Assistant Examiner* — Jerry Blevins
(74) *Attorney, Agent, or Firm* — Antonelli, Terry, Stout & Kraus, LLP.

(57) ABSTRACT

An object of the present invention is to prevent the domain from being generated in the pixel end portions so that the transmittance can increase in an IPS type liquid crystal display device where the size of the pixels is extremely small. In the liquid crystal display device according to the present invention, the electrodes close to the liquid crystal layer have a comb-like structure having a linking portion only at one pixel end, the end portion of the comb-like structure has a structure for preventing the domain from growing, the width of the slits in the comb-like structure is greater than the width of the electrodes, and the alignment of the liquid crystal layer has such a pretilt angle that the liquid crystal rises from the end portion in the comb-like structure towards the root in the interface close to the electrode.

17 Claims, 32 Drawing Sheets

LCL : liquid crystal layer
PE : pixel electrode
AD : alignment direction
RD : direction of alignment process LCL : liquid crystal layer
PE : pixel electrode
AD : alignment direction
RD : direction of alignment process SL : signal line
TFT : active element RT : reverse twist alignment portion DO
domain at end of
connection portion

PE

DO  DL      PE
    dark line

| | in the case there is no twist alignment | in the case there is twist alignment (twist angle: 180 degrees) |
|---|---|---|
| tilt angle: 0 degrees | (a)  no spray deformation | (b)  no spray deformation |
| tilt angle: other than 0 degrees — same symbol | (c)  no spray deformation | (d)  maximum spray deformation |
| tilt angle: other than 0 degrees — opposite symbol | (e)  maximum spray deformation | (f)  no spray deformation |

FIG. 17

| | alignment angle(degrees) | | | | |
|---|---|---|---|---|---|
| | 2.5 | 5.0 | 7.5 | 10.0 | 15.0 |
| comb tooth pitch(μm) 3.0 | ○ | ○ | ○ | ○ | ○ |
| 4.0 | △ | ○ | ○ | ○ | ○ |
| 5.0 | △ | △ | ○ | ○ | ○ |
| 6.0 | △ | △ | △ | △ | △ |
| 8.5 | × | △ | △ | △ | △ |
| 10.0 | × | × | × | × | × |

EF : line of electric force

LIQUID CRYSTAL DISPLAY DEVICE

The present application claims priority over Japanese Application JP 2008-099986 filed on Apr. 8, 2008, the content of which is hereby incorporated into this application by reference.

BACKGROUND OF THE INVENTION (1) Field of the Invention

The field of application to which the present invention pertains is liquid crystal display devices.

(2) Related Art Statement

As the speed of communication of portable information devices and the capacitance of memories increase, video information having greater capacitance and moving images having a greater number of frames can be handled. Display devices, which are the interface, are required more than ever to have higher image quality, larger screens and a greater number of pixels. Meanwhile, the designs have been reviewed as the portable information devices market has matured, and thin, stylish designs tend to be preferred. Together with this, thinner display devices are required.

IPS (in-plane switching) type liquid crystal display devices have an in-plane electric field of which the main component is parallel to the plane of the liquid crystal formed between pixel electrodes and common electrodes formed on the same substrate, and thus, the liquid crystal layer is driven. Therefore, in the IPS type liquid crystal display devices, rotation within the liquid crystal layer is a main change in the alignment of the liquid crystal layer as an electric field is applied. In the VA (vertically aligned) type, the ECB (electrically controlled birefringence) type, the OCB (optically compensated birefringence)-type and the like, a change in the alignment of the liquid crystal layer as an electric field is applied is mainly a change in the tilt angle, while the change in the tilt angle is small in the IPS type liquid crystal display devices. As a result, a change in the effective value of retardation is small as a voltage is applied in the IPS type liquid crystal display devices, and a display excellent in the gradation reproducibility can be gained in a wide view angle range. Therefore, the demand for an increase in the image quality can be more satisfied in the IPS type liquid crystal display devices.

In addition, in the VA type used as middle- and small-sized liquid crystal displays, the view angle properties increase through the conversion to multi-domains, and at this time, quarter wavelength plates are layered between the liquid crystal panel and the upper and lower polarizers in order to prevent the lowering of the transmittance. The quarter wavelength plates cause the thickness of the VA type liquid crystal display devices to increase. However, the IPS type liquid crystal display devices do not require a quarter wavelength plate, and therefore, the demand for a reduction in the thickness can be more satisfied.

Liquid crystal display devices, including the IPS type, are generally non-light emitting type display devices, and therefore, the brightness of the display is determined by the transmittance in addition to the brightness of the light source. There are examples focusing on the elastic constant of the liquid crystal layer in order to increase the transmittance of the IPS type liquid crystal display devices (for example, Patent Document 1).

[Patent Document 1] Japanese Unexamined Patent Publication 2002-296611

SUMMARY OF THE INVENTION (Problem to be Solved by the Invention)

From among various IPS type liquid crystal display devices, the transmittance is high in IPS-Pro (in-plane switching-provectus) type liquid crystal display devices where pixel electrodes and common electrodes are layered on top of each other with an electrode insulating layer in between, and either type of electrodes is provided as one sheet of electrodes. This is because electric lines of force in arc form are formed so as to connect the electrodes in different layers, and the electric field is distributed in the vicinity of the center of the electrodes. Such electric fields in arc form that connect electrodes in different layers are referred to as fringe electric fields.

Focusing on the structure of the IPS type liquid crystal display devices in a plane, it is found that electrodes in stripes and slits for separating the electrodes are aligned regularly at least in the center of the pixels; whereas, the electrodes in comb tooth form are linked in order to secure the electrical connection in the end portions of the pixels. Focusing on two pixel ends at both ends of a slit, at least one pixel end must be provided with a linking portion as described above. Pixel ends having no linking portions are formed as the comb tooth ends in a plane. In either case the pixel end portions have such a structure that the electrodes are closed, and therefore, the fringe electric field distributes in such a direction that it rotates by 180 degrees in the pixel end portions.

Therefore, in the pixel end portions, such fringe electric fields are generated without fail that the rotation in the direction opposite to the rotation generated in the center of the pixels is provided to the liquid crystal layer. In the case where the alignment in the liquid crystal for the opposite rotation appears accordingly throughout the entirety of the liquid crystal layer in the direction of the thickness, such a portion is generated in the border of the liquid crystal layer exhibiting a normal rotation that the alignment barely changes. The alignment in this portion is approximately the same as when no voltage is applied, and therefore, this portion is observed as a dark line. This dark line portion is referred to as domain and causes the transmittance to lower.

Resolution has been increased in liquid crystal display devices mounted in portable information devices, and together with this, the size of the pixels has been reduced. When the size of the pixels is reduced, the contribution of the end portions of the pixels to the entirety of the pixels increases relatively, and therefore, such effects of the domain as to lower the transmittance increase in the IPS-Pro type liquid crystal display devices.

An object of the present invention is to provide a liquid crystal display device where a domain can be prevented from being generated in the pixel end portions so that the transmittance can be increased.

(Means for Solving Problem)

The liquid crystal display device according to claim 1 of the present invention which is provided in order to solve the above described problems has a liquid crystal panel made of a first substrate, a second substrate and a liquid crystal layer sandwiched between the above described first substrate and the above described second substrate, wherein the liquid crystal panel has a first polarizer and a second polarizer on the top and at the bottom; the liquid crystal panel has a number of pixels which can be controlled independently; each pixel has a pair of electrodes, a pixel electrode and a common electrode, in a display portion on the surface of the second substrate close to the liquid crystal layer; the pixel electrode and the common electrode are layered on top of each other with an insulating layer in between; either the pixel electrode or the common electrode further away from the liquid crystal layer is provided as a portion of an electrode sheet in a plane; and the liquid crystal layer is driven by applying an electrical field of which a main component is parallel to the liquid crystal plane, and is characterized in that either the pixel electrode or the common electrode which is close to the liquid crystal layer has a comb-like structure where a linking portion is provided only on one side in a plane, an end portion of the comb-like structure has an end portion structure for preventing a domain from growing, the width of the slits in the comb-like structure is greater than the width of the electrodes, and the alignment in the liquid crystal layer has such a pretilt angle that the liquid crystal rises from the end portions in the comb-like structure towards the root in the interface close to the electrodes.

(Effects of the Invention)

According to the present invention, domain can be prevented from being generated in the pixel end portions so that the transmittance can be increased in the IPS-Pro type liquid crystal display devices.

BRIEF DESCRIPTION OF THE DRAWINGS

FIG. 17 is a table showing the appearance of the domain at the linking portion end in the IPS-Pro type liquid crystal display devices under various conditions;

EXPLANATION OF SYMBOLS

LCL . . . liquid crystal layer
PE . . . pixel electrode
AD . . . alignment direction
RD . . . alignment process direction
PL1 . . . first polarizer
PL2 . . . second polarizer
SU1 . . . first substrate
SU2 . . . second substrate
LL . . . flat layer
CF . . . color filter
AL1 . . . first alignment film
AL2 . . . second alignment film
GL . . . scanning line
SE . . . source line
CE . . . common electrode
CH . . . contact hole
BM . . . black matrix
PCIL . . . inter-electrode insulating film
CEIL . . . common electrode insulating film
GIL . . . scanning line insulating film
SL . . . signal line
TFT . . . active element
RT . . . reverse twist alignment portion
DO . . . domain at end of connection portion
DL . . . dark line
EF . . . line of electric force

DETAILED DESCRIPTION OF THE INVENTION

In the following, the IPS-Pro type liquid crystal display devices according to the embodiments of the present invention are described in reference to the drawings.

First Embodiment

Figure 2A:
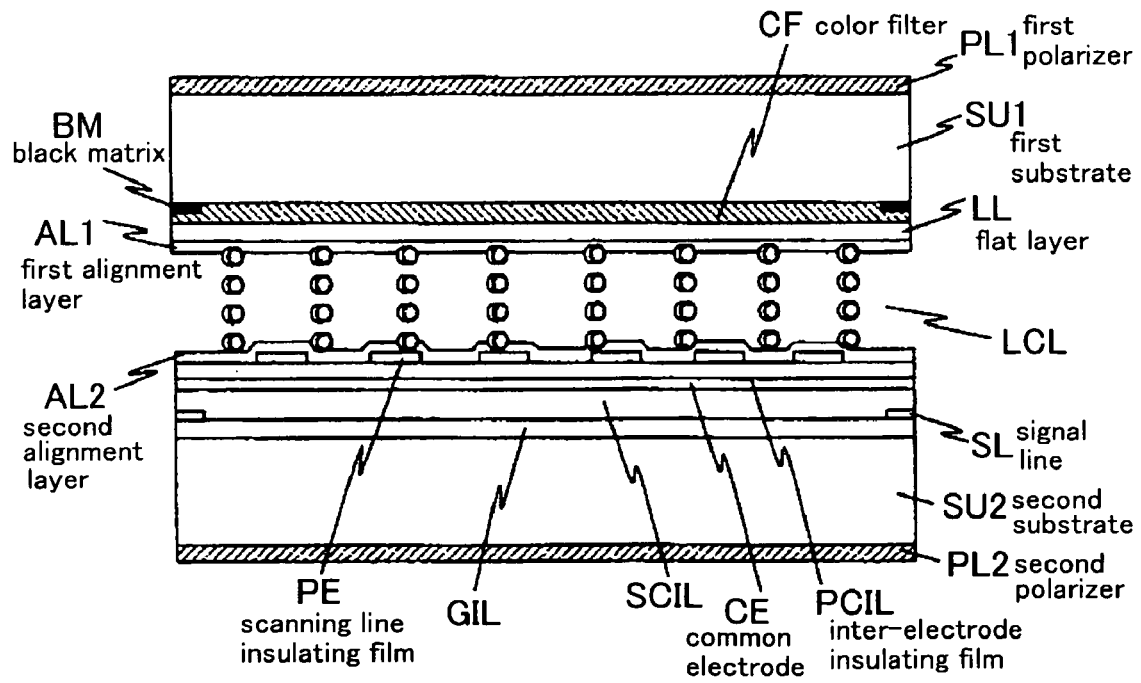
FIGS. 2A and 2B are cross sectional diagrams showing one pixel of the liquid crystal display device according to the first embodiment.
Figure 2B:
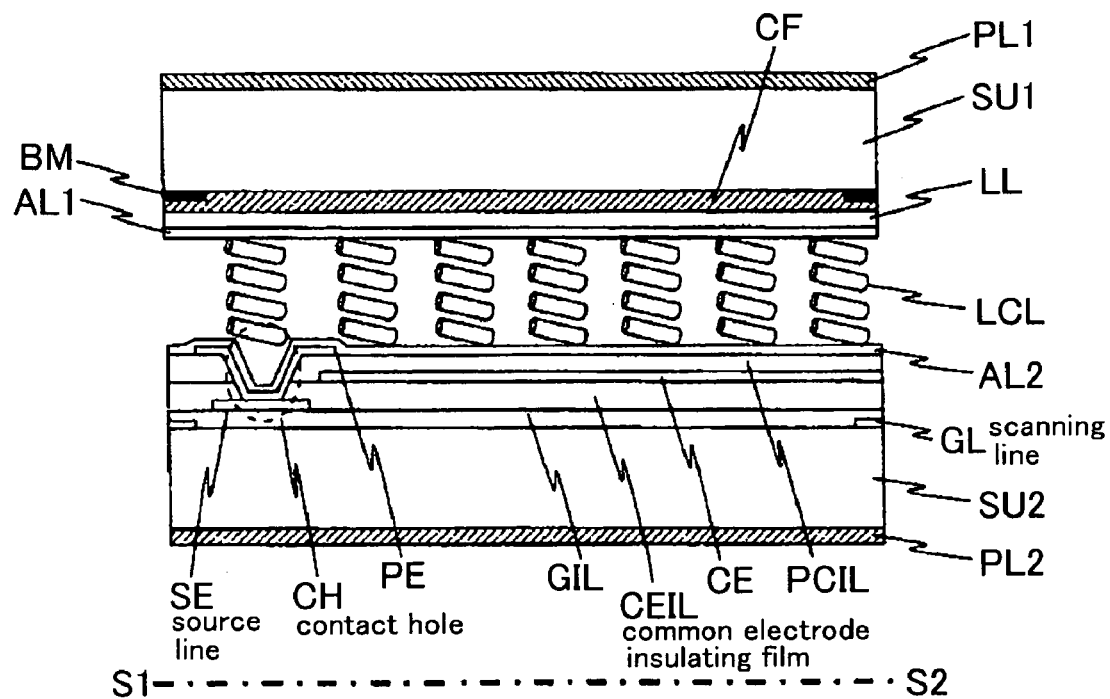

FIGS. 2A and 2B are schematic cross sectional diagrams showing one pixel of the liquid crystal display device according to the present invention. S1, S2, S3 and S4, which show cross sections in FIGS. 2A and 2B, correspond to those in FIG. 3. The liquid crystal display device according to the present invention is made mainly of a first substrate, a second substrate and a liquid crystal layer, with the first substrate and the second substrate sandwiching the liquid crystal layer. In addition, the first substrate and the second substrate are provided with an alignment layer for stabilizing the state of alignment of the liquid crystal layer on the surface close to the liquid crystal layer. In addition, the surface of the second substrate close to the liquid crystal layer is provided with a means for applying a voltage to the liquid crystal layer.

The first substrate is made of borosilicate glass having a thickness of approximately 0.4 mm, and a first alignment layer, a flat film, a color filter and a black matrix are layered in a pixel portion in sequence on the side close to the liquid crystal layer. The first alignment layer is a polyimide based organic polymer film, and an alignment process is carried out in accordance with a rubbing method, and is a horizontal alignment layer for providing a pretilt angle of approximately 1.5 degrees to the nearby liquid crystal layer. The flat film is made of an acryl based resin, highly transparent, flattens unevenness on the base and functions to prevent a solution from permeating. The color filter is formed of a resist containing a red, green or blue pigment.

The second substrate is made of borosilicate glass, as is the first substrate, and provided mainly with a second alignment layer, a pixel electrode, an inter-electrode insulating film, a common electrode, a TFT (thin film transistor), a scanning line and a signal line. The second alignment layer is a horizontal alignment film, as is the first alignment layer. The pixel electrode and the common electrode are both made of ITO (indium tin oxide), and highly transparent and conductive, with a layer thickness of 80 nm. The pixel electrode and the common electrode are separated by an inter-electrode insulating film made of silicate nitride (SiN), and the layer thickness of the inter-electrode insulating film is 300 nm. The pixel electrode has a comb-like form in a plane, and connected in the pixel end portion, whereas the common electrode covers the entirety of the transparent portion in a pixel in a plane.

As described above, the pixel electrode and the common electrode are separated by an inter-electrode insulating film, and the inter-electrode insulating film is sufficiently thin, and thus, lines of electric force are formed between the pixel electrode and the common electrode. At this time, the lines of electric force penetrate through the inter-electrode insulating film and are mainly distributed in the liquid crystal layer, and in addition, form an in-plane electric field having a main component parallel to the flat surface of the substrate. As a result, the alignment change particular to the IPS type liquid crystal display devices is such that the direction of alignment of liquid crystal changes so as to rotate mainly within the plane in the layer when a voltage is applied.

In addition, as shown in FIGS. 2A and 2B, there are many portions where the pixel electrode and the common electrode overlap, and these portions are linked to the liquid crystal layer in parallel, and therefore function as a transparent holding capacitor for keeping the voltage value applied to the liquid crystal layer constant during the holding period. The holding capacitor is transparent and can drive the liquid crystal layer above the holding capacitor, and thus, a high aperture ratio and excellent holding properties can both be achieved.

Figure 3:
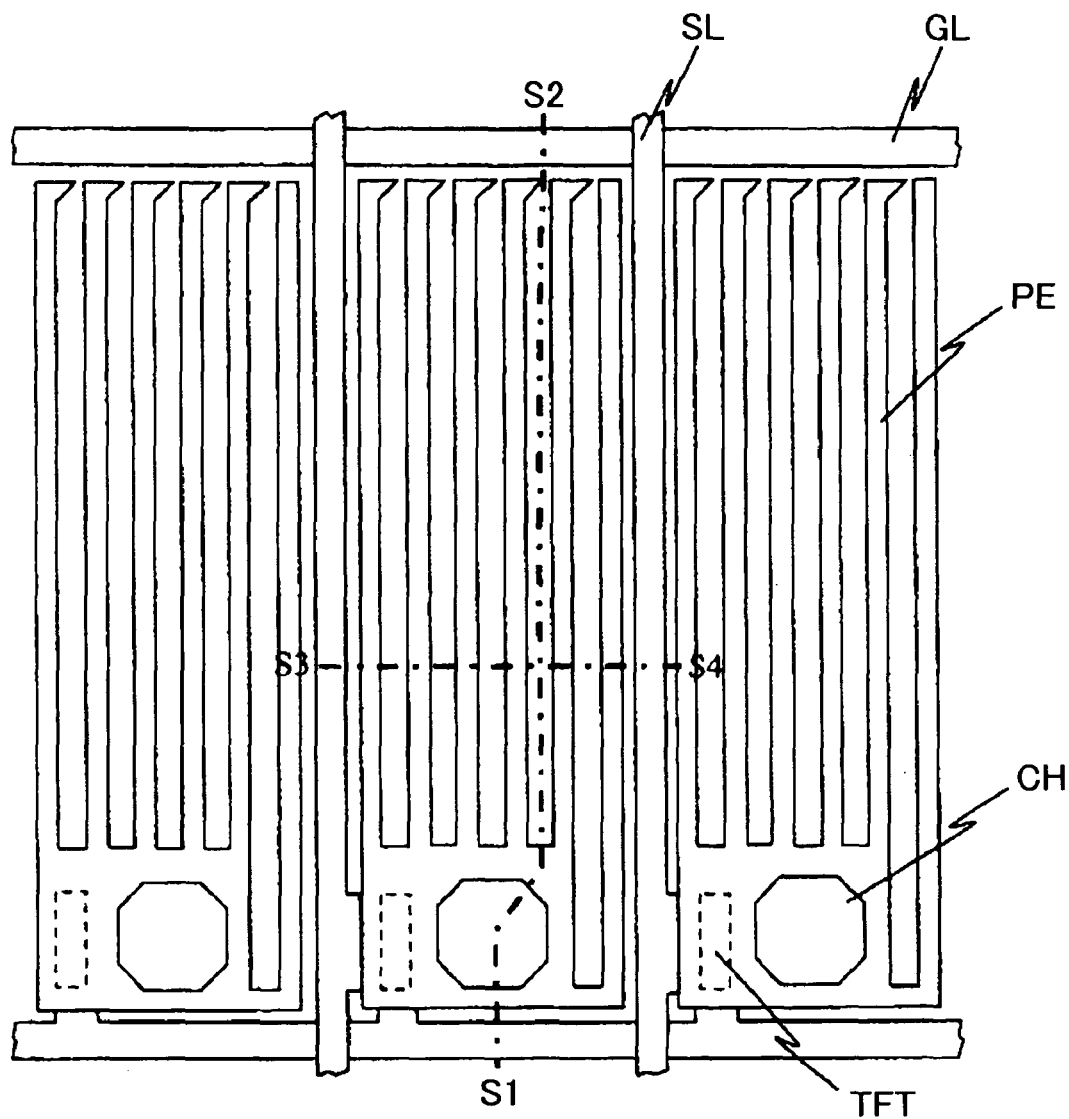
FIG. 3 is a plan diagram showing the arrangement of electrodes and wires in one pixel of the liquid crystal display device according to the first embodiment.

Here, as shown in FIG. 3, the stripes of pixel electrodes are parallel in the direction of the long side of the pixels, and the direction of the slit structure is uniform within the pixels. When the direction of the scanning lines is 0 degrees and the azimuths defined as counterclockwise, the direction of each stripe structure is 90 degrees and the liquid crystal alignment direction is 85 degrees. The stripes are linked on the lower side in FIG. 3, and the ends of the stripes are aligned as the ends of comb teeth on the upper side. A structure in triangular form is added to the end of each stripe, and as described below, these portions function to prevent the domain in an end portion of the pixels from expanding.

Figure 4:
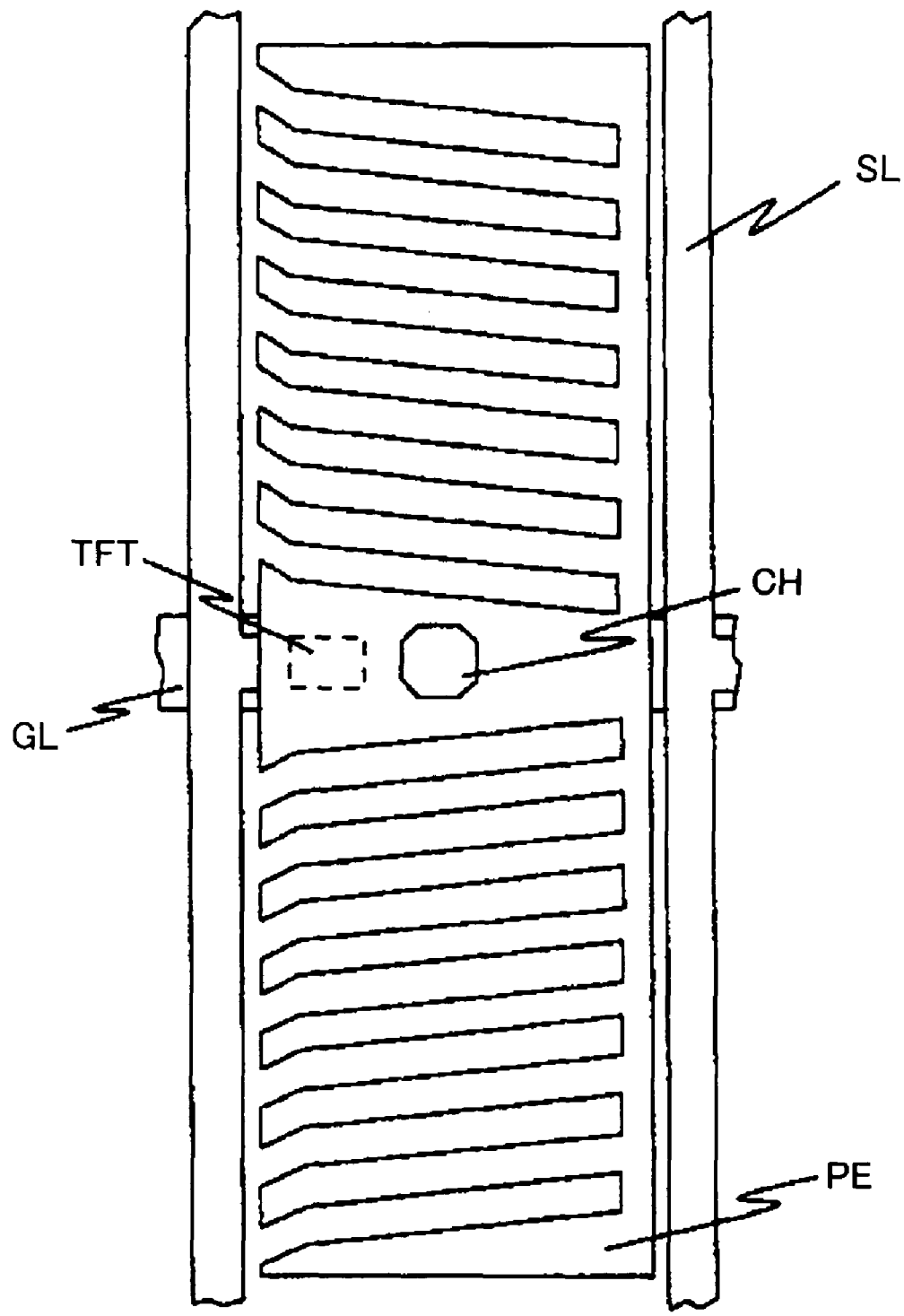
FIG. 4 is a plan diagram showing a pixel electrode having two regions aligned where the alignment in liquid crystal rotates in different directions when a voltage is applied.

FIG. 4 shows an example of a different pixel electrode from the above, and the stripes of pixel electrodes are directed in the direction closer to the shorter side of the pixels. There are separate regions where the angle of the direction in the slit structure is 5 degrees and −5 degrees at the top and the bottom within each pixel, and the area ratio is one to one. The direction of rotation of the liquid crystal alignment direction is different when a voltage is applied between the two regions; that is to say, one is clockwise and the other is counterclockwise. The two regions have the direction of the view angle for bright display tinged with yellow and the direction of the view angle for bright display tinged with blue, respectively, but the two are observed simultaneously, and thus, the colors are offset. As a result, the direction of the view angle for colorless display is provided.

Signal lines and scan lines cross each other, as shown in FIG. 3, and TFT's are provided close to the respective intersections, which correspond to pixel electrodes one-to-one. A potential corresponding to an image signal is provided to these pixel electrodes through signal lines, via TFT's and contact holes. In addition, the operation of the TFT's is controlled by a scan signal through the scan lines. The channel portion of the TFT's is made of an amorphous silicon layer. Alternatively, the channel portion of the TFT's may be formed of a polysilicon layer having higher mobility. The channel portion of the TFT's is covered with a channel portion inorganic insulating film, and thus, the operation is stabilized, and the channel portion with unevenness is flattened by a channel portion organic insulating film, and thus, the parasitic capacitance lowers. The pixel electrodes are in rectangular form and controlled independently, and arranged in lattice form on the second substrate. Each pixel electrode is connected to a TFT in a through hole portion.

A liquid crystal material having a nematic phase within a wide temperature range, including at room temperature, positive anisotropy in the dielectric constant and a high resistance is used for the liquid crystal layer. The voltage during the holding period, during which the TFT for write-in of a pixel is turned off, lowers sufficiently little, and thus, the transmittance can be maintained during the holding period, and flickering can be prevented.

An alignment process is carried out on the first alignment layer and the second alignment layer in accordance with a rubbing method, and after that, the first substrate and the second substrate are combined. The gap between the first substrate and the second substrate can be kept uniform using post spacers arranged on the first substrate side. The post spacers are approximately in columnar form and provided between the pixels. A liquid crystal material is sealed in the gap between the first substrate and the second substrate in a vacuum, so that the above described liquid crystal layer is provided. The liquid crystal layer has a homogenous alignment, and the alignment direction is 5 degrees relative to the scanning lines. The angle between the direction of the electric field when a voltage is applied and the alignment direction is 85 degrees, which is sufficiently large, and therefore, the liquid crystal alignment direction is sufficiently rotated when a voltage is applied, and thus, a high transmittance can be gained.

A first polarizer and a second polarizer are provided outside the first substrate and the second substrate, and the first polarizer and the second polarizer contain iodine based coloring matter, and their dichromatism converts natural light to partially polarized light which is extremely close to linearly polarized light. The absorption axes of the first polarizer and the second polarizer cross at a right angle as viewed in the direction of the normal of the plane, and the absorption axis of the first polarizer is parallel to the liquid crystal alignment direction.

In the present invention, the domain in an end portion of the pixels is focused on, and the transmittance of IPS-Pro type liquid crystal displays is increased by shrinking it.

Therefore, first it was attempted to find the cause of the domain in an end portion of the pixels. As described above, change in the liquid crystal alignment when a voltage is applied to an IPS type liquid crystal display device is rotation within the layer, and the direction of rotation is the opposite inside the domain. Change in the alignment induced by a fringe electric field in the liquid crystal layer is determined by the relationship between the direction of the fringe electric field and the liquid crystal alignment direction when no voltage is applied. Change in the liquid crystal alignment results from dielectric relaxation when a voltage is applied, and therefore, clockwise or counterclockwise rotation; whichever makes the liquid crystal alignment direction parallel to the fringe electric field with a smaller rotation, is selected.

IPS-Pro type pixel electrodes can be categorized in structures having connection portions on the two sides of an end of the pixel and structures having a connection portion only on one side. Hereinafter, the former are referred to as slit structures and the latter are referred to as comb tooth structures.

Figure 5A:
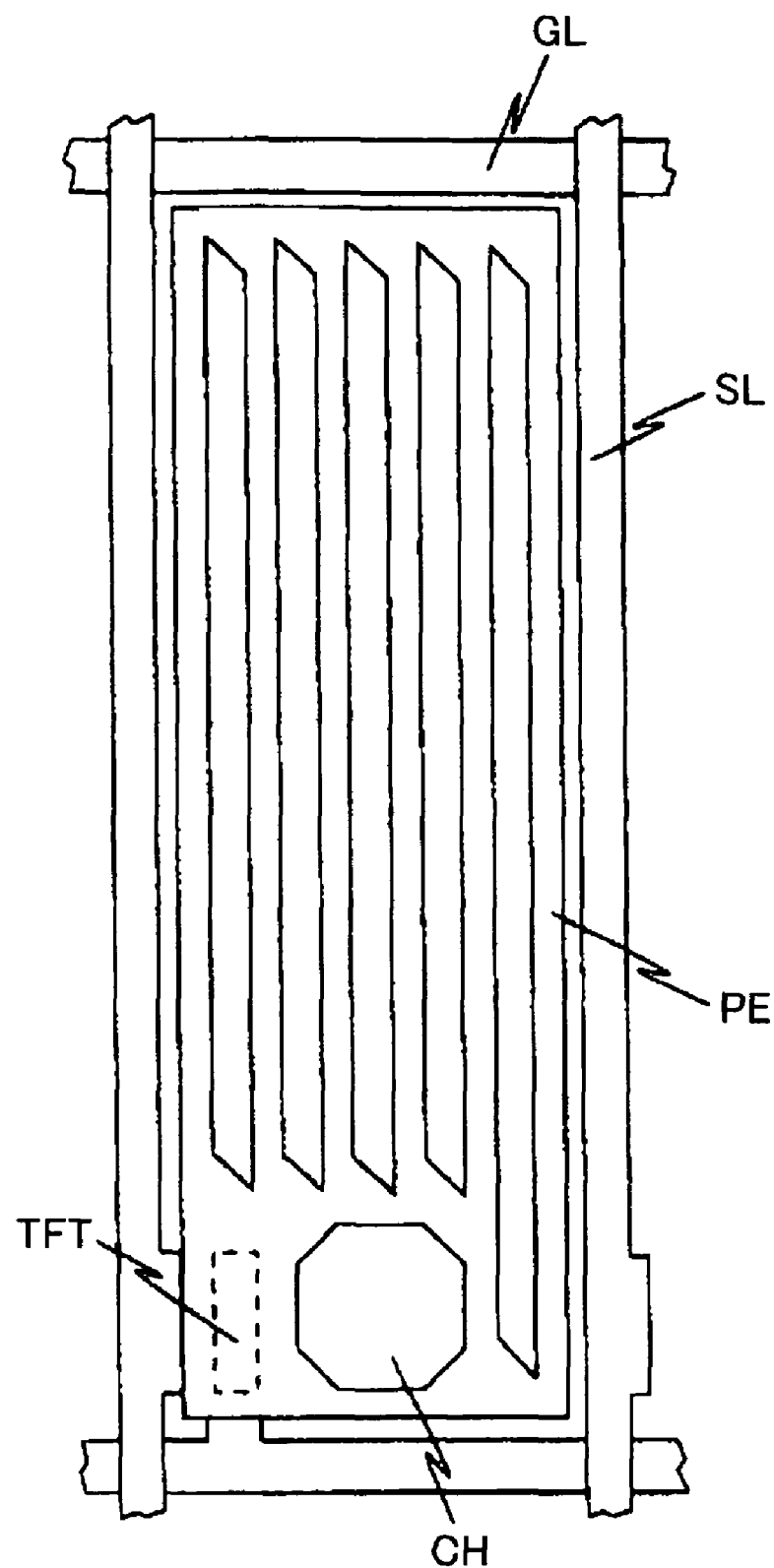
FIGS. 5A and 5B are plan diagrams showing a pixel electrode having a linking portion on the two sides of the pixel ends.
Figure 5B:
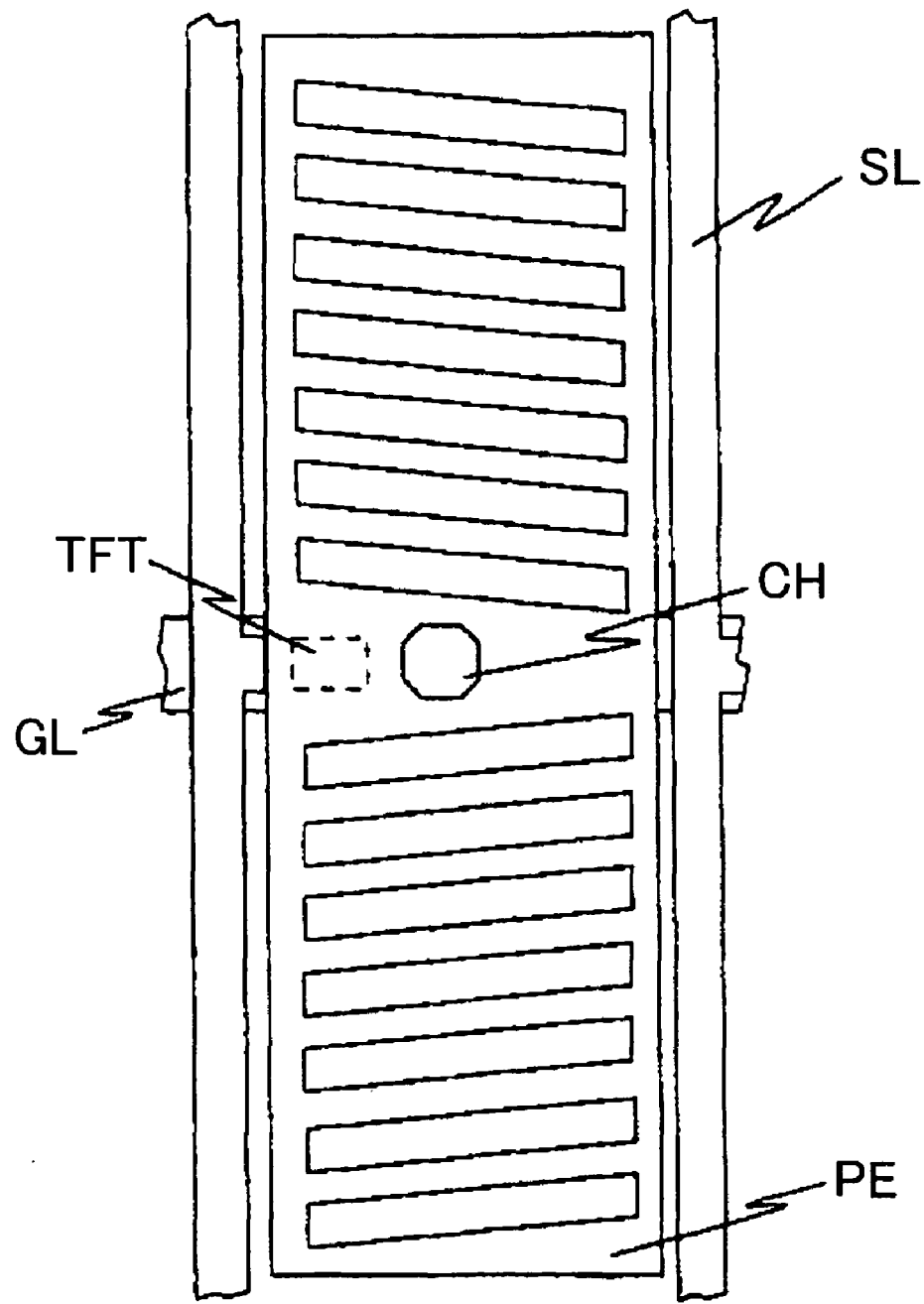

The pixel electrodes shown in FIGS. 3 and 4 have a comb tooth structure, and pixel electrodes having a slit structure corresponding to these are shown in FIGS. 5A and 5B. Whether the pixel electrode has a slit structure or a comb tooth structure, the direction of the fringe electric field rotates 180 degrees in an end portion of the pixels, and therefore, there is always a portion which makes the liquid crystal layer rotate in the opposite direction.

FIGS. 3 to 5B all show an ideal pixel electrode in a case where the processing precision is sufficiently high and an end portion of the pixel electrode has an acute angle.

Figure 6A:
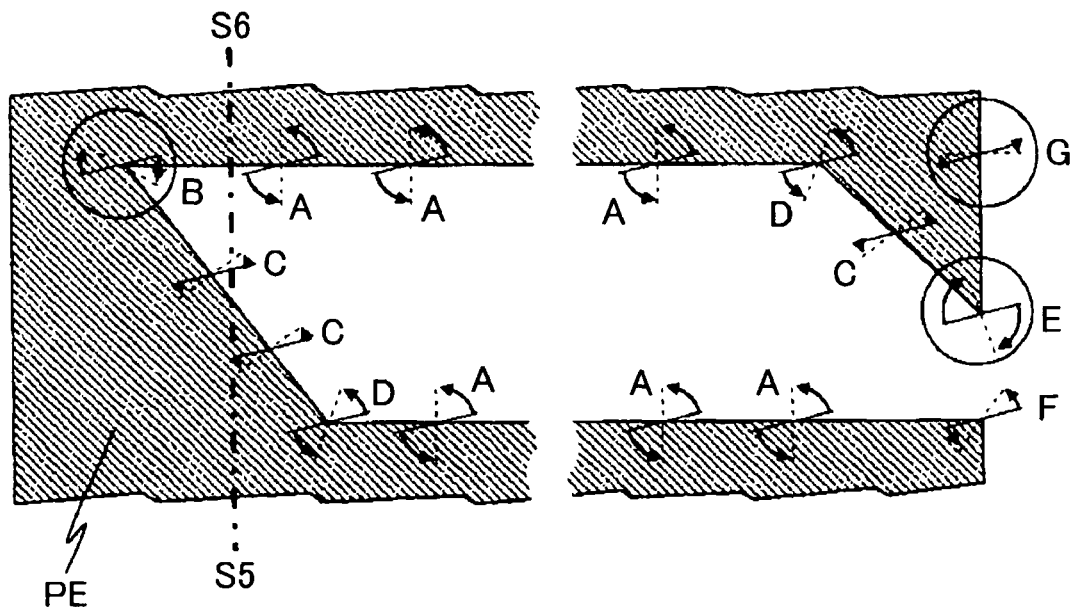
FIGS. 6A and 6B are plan diagrams showing the direction in which the alignment of the liquid crystal rotates when a voltage is applied to an idealistic pixel electrode where the pixel ends have an acute angle.
Figure 6B:
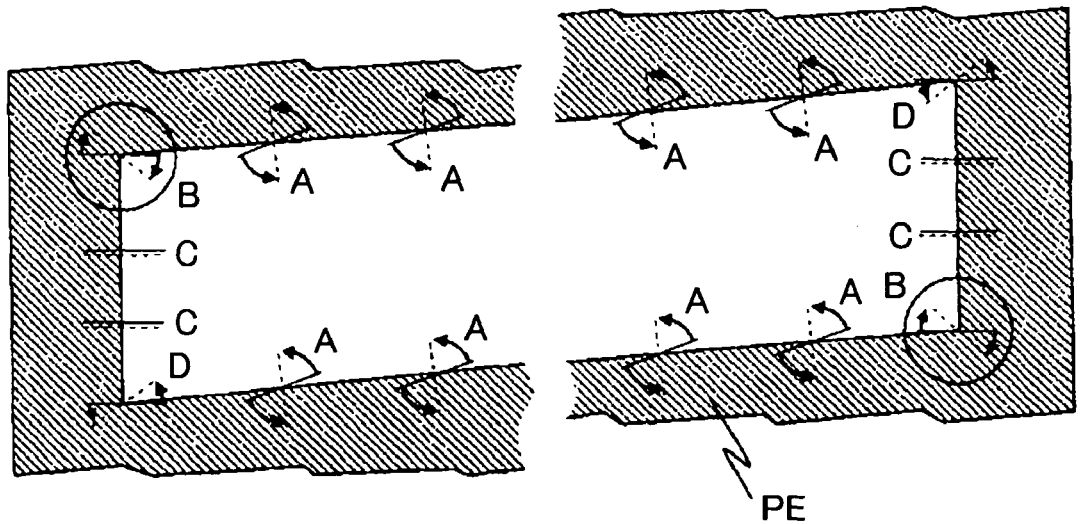

FIGS. 6A and 6B are enlargements of pixel electrodes having a comb tooth structure and a slit structure showing the direction of rotation of the liquid crystal alignment when a voltage is applied. Solid lines indicate the liquid crystal alignment direction when no voltage is applied, and broken lines indicate the direction of the fringe electric field. Portions having different liquid crystal orientations are categorized with symbols A-D attached, and portions providing opposite rotation are circled. G is located outside the comb tooth electrode and does not affect the state of the liquid crystal alignment inside the pixel electrodes. Only B and E are portions which are located inside the pixel electrodes and provide opposite rotation, which are corners in the comb tooth structure. In the case of a slit structure, only B is such a portion, which is a corner. Thus, in the case where an end portion of a pixel has an acute angle, there is a portion which provides opposite rotation only in the corner inside the pixel electrode.

Figure 7A:
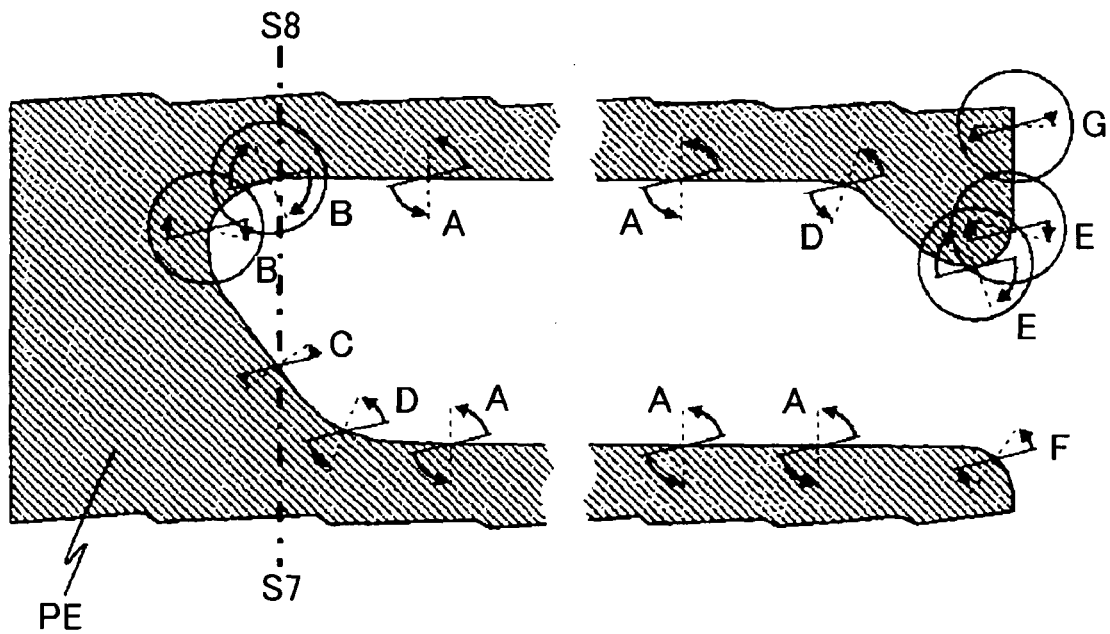
FIGS. 7A and 7B are plan diagrams showing the direction in which the alignment of the liquid crystal rotates when a voltage is applied to a pixel electrode having no acute angles.
Figure 7B:
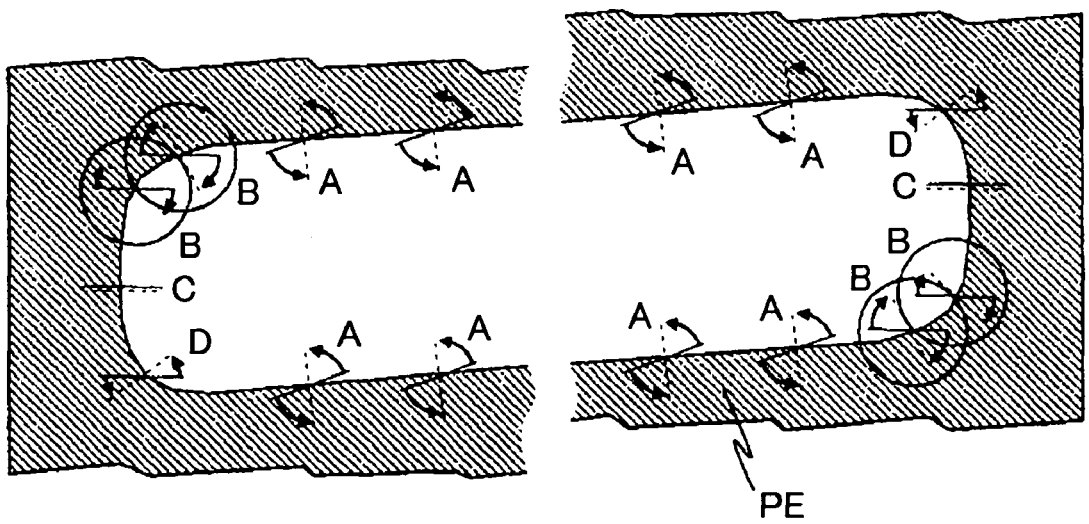

In reality, however, there is a limit to the precision of processing, and therefore, the acute angle disappears, and the end portion of pixels becomes round. The direction of rotation of the liquid crystal alignment when a voltage is applied at this time is shown in FIGS. 7A and 7B. The acute angle in the end portion of the pixels disappears, and thus, B and E are not limited to the points in the corners, but have a width. The portion for providing opposite rotation to the liquid crystal layer is larger than in the ideal case, where there is an acute angle.

Figure 8A:
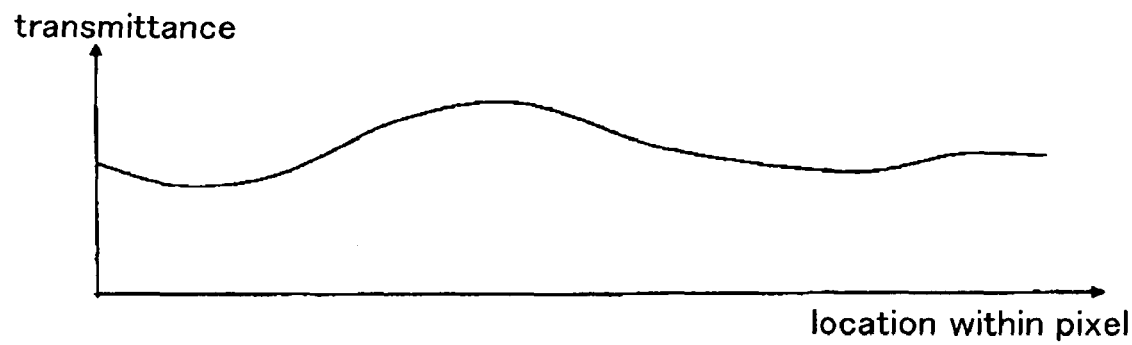
FIGS. 8A and 8B are a graph and a cross sectional diagram showing the distribution of the transmittance in the pixel end portions on the linking portion side having no domain at the linking portion end.
Figure 8B:
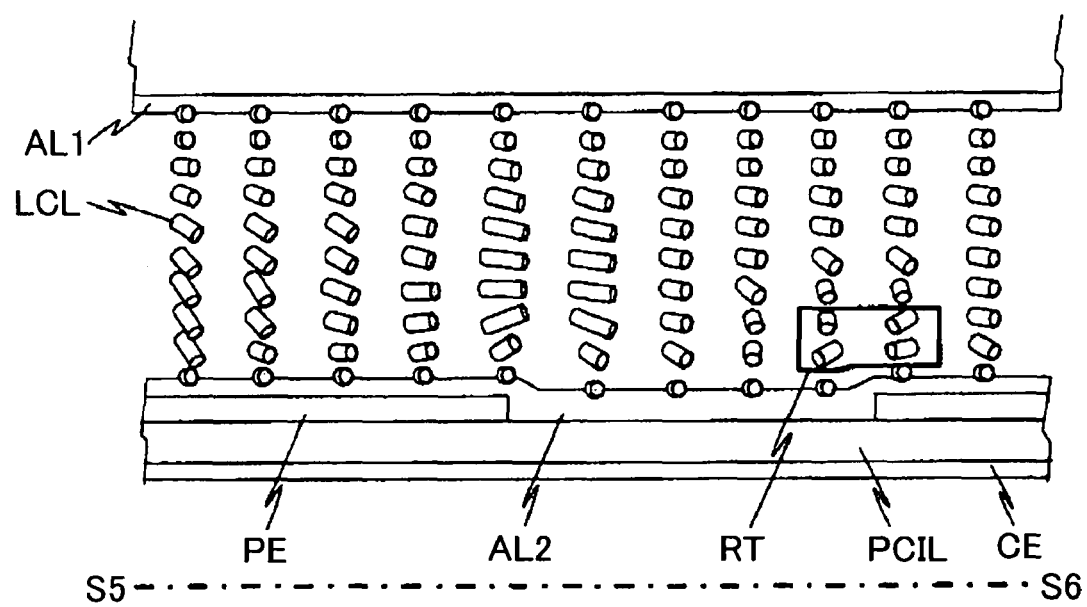

FIGS. 8A and 8B schematically show the results of reproduction of the transmittance and the orientation state in the end portion of pixels using LCD Master, which is a program for calculating three-dimensional liquid crystal alignment made by Shintec Co., Ltd.

FIG. 8B shows the liquid crystal alignment state in a cross section along S5-S6 in FIGS. 6A and 6B, and FIG. 8A shows the corresponding distribution in the transmittance. The portion surrounded by a thick line is reverse twist alignment, which appears in the interface of the liquid crystal close to the pixel electrode. It seems that such reverse twist liquid crystal alignment is always in the interface of the liquid crystal close to the pixel electrode. However, there is no further growth in the case where the regulating force from the surrounding normal alignment portion is strong. As shown in FIG. 8A, the distribution of the transmittance at this time does not show any clear minimum point. Even when the relationship between the portions where there is reverse twist alignment and the distribution of the transmittance is focused on, no distribution can be observed in the transmittance, in terms of to the distribution of the reverse twist alignment, and no domain can be observed.

The reverse twist alignment sometimes overcomes the regulating force from the surrounding normal alignment portion so as to spread throughout the entirety in the direction of the thickness of the liquid crystal layer. Cases where the acute angle in an end portion of the pixel disappears correspond to this, and the results of electro-optical calculation in an end portion of the pixel at this time are shown in FIGS. 9A and 9B.

Figure 9A:
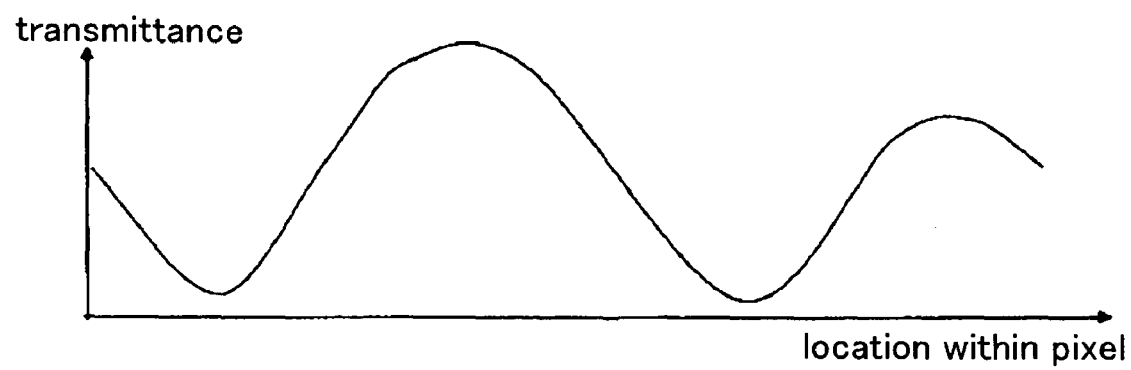
FIGS. 9A and 9B are a graph and a cross sectional diagram showing the distribution of the transmittance in the pixel end portions on the linking portion side having a domain at the linking portion end.
Figure 9B:
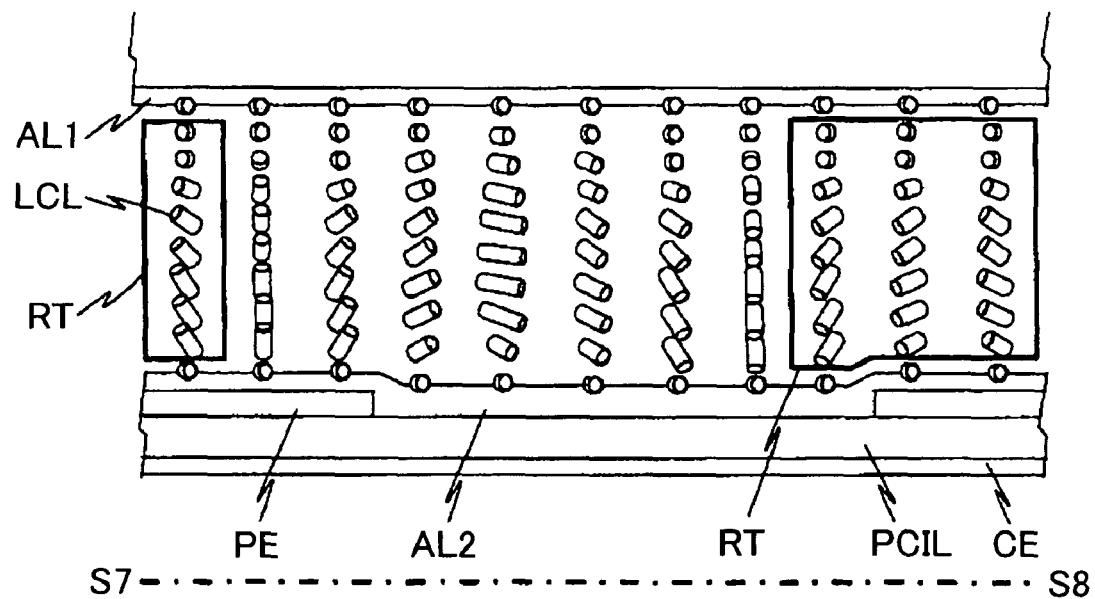

FIG. 9B shows the liquid crystal alignment state in the cross section along S7-S8 in FIGS. 7A and 7B, and FIG. 9A shows the distribution of the transmittance corresponding to this. The reverse twist alignment surrounded by the thick line spreads throughout the entirety of the liquid crystal layer in the direction of the thickness, and is distributed in a wide area within the plane of the liquid crystal layer in comparison with in FIG. 8B. In addition, a clear minimum point appears relating to the distribution of the reverse twist alignment in the distribution of the transmittance. That is to say, change in the liquid crystal alignment is small in the border between the reverse twist alignment and the normal alignment portion, which is approximately the same alignment state as when no voltage is applied. In this portion, the transmittance is the minimum, and this becomes a dark line when observed as a domain. When the acute angle in an end portion of the pixel electrode disappears, as described above, the portion which provides reverse rotation to the liquid crystal layer in the pixel electrode expands, and therefore, reverse twist alignment easily expands, and a domain tends to more easily appear. That is to say, in the pixel electrodes which are actually formed, a domain appears more easily than anticipated at the stage of design.

The connection portions at the ends of pixels become ineffective regions, because no voltage is applied to the liquid crystal layer. Therefore, the comb tooth structure, where the connection portion is only on one side is more advantageous for increasing the transmittance than the slit structure, where connection portions are at the two ends. A domain appears in an end portion of the comb teeth having no connection portion in the comb tooth structure, and expansion of the domain can be prevented by introducing a domain controlling structure in the end portions of the comb teeth. The pixel electrodes shown so far have a domain controlling structure, and are categorized into two types: triangular structures and diagonal slit structures. The pixel electrodes shown in FIGS. 3 and 5A have a triangular structure, and the pixel electrodes shown in FIGS. 4 and 5B have a diagonal slit structure. In either domain controlling structure, the liquid crystal alignment of reverse rotation can be prevented from expanding when the portion for providing normal rotation comes close to the portion for providing reverse rotation.

Here, a cylindrical model and a nail shape model are both used in order to show the state of alignment of the liquid crystal layer in the present specification, but the latter is used in the case where a tilt angle is clearly shown, particularly in a plan diagram.

A domain also appears on the connection portion side in the comb tooth structure, and this can be prevented by providing a domain controlling structure on the connection portion side. However, the transmittance at this time lowers to the same as in the slit structure, and the object of increasing the transmittance cannot be achieved. This is because the ineffective region, where no voltage is applied to the liquid crystal layer, increases when a triangular structure is provided at an end of the connection portion. In addition, when a diagonal slit structure is provided at an end of the connection portion, the angle between the liquid crystal alignment direction when no voltage is applied and the fringe electric field becomes smaller, and the rotational angle of the liquid crystal alignment decreases when a voltage is applied. Accordingly, in the present invention, the comb tooth structure does not change on the connection portion side, and the domain at an end of the connection portion is controlled. FIGS. 3 and 4 show a diagonal slit structure provided only in an end portion of the comb teeth without the structure on the connection portion side changing.

Therefore, first the domain at an end of the connection portion is reproduced through calculation of the liquid crystal alignment, and the state of alignment inside the domain at an end of the connection portion is observed.

Figures 10A, 10B:
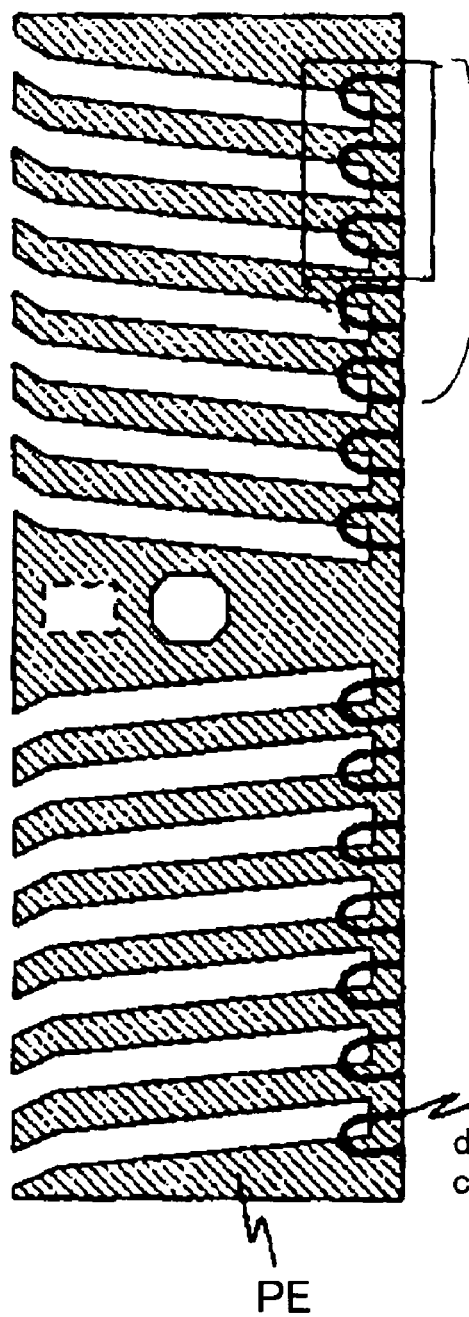
FIGS. 10A to 10D are plan diagrams showing the state of alignment within the domain at the linking portion end.
Figure 10B:
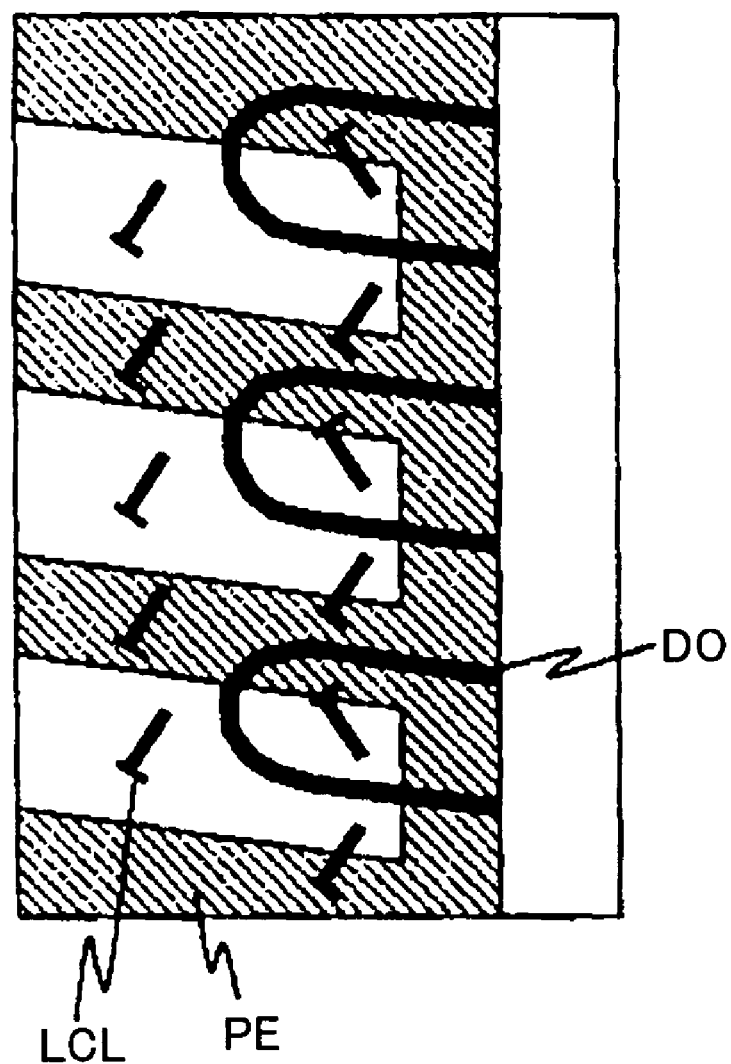

FIG. 10A shows a pixel electrode and the state of distribution of the domain at an end of the connection portion, where the domain at an end of the connection portion is distributed in lying down U shape, so that the nearby pixel electrode and the center portion of the slit are connected.

FIG. 10B is a diagram showing the state of alignment within the domain at an end of the connection portion and the normal portion focusing on the distribution of the azimuth of the alignment direction, as well as the state of liquid crystal alignment in a plane of the layer where the fringe electric field is strongest within the liquid crystal layer.

As can be seen in FIG. 10B, the direction of liquid crystal alignment when no voltage is applied is a horizontal direction, and therefore, there is a twist alignment opposite to the normal portion within the domain at an end of the connection portion.

Figure 10C:
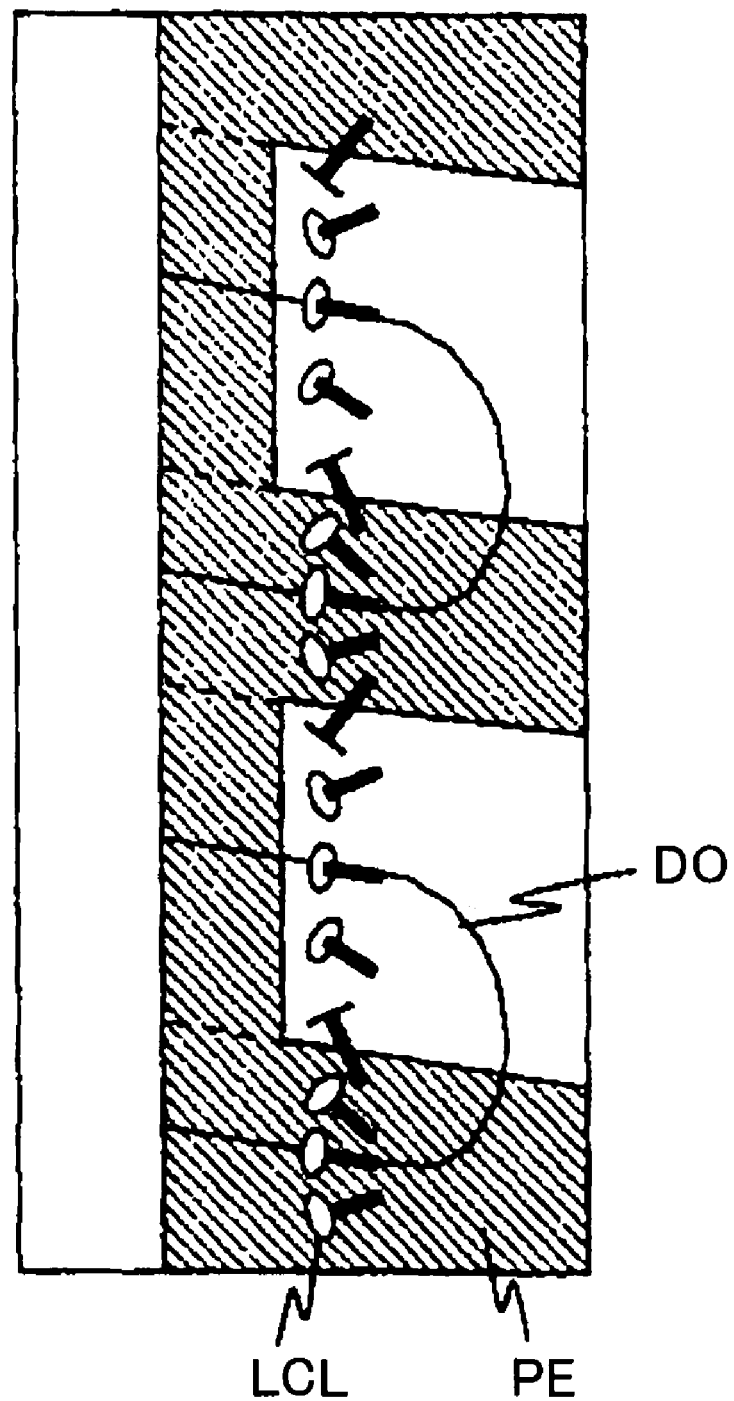
Figure 10D:
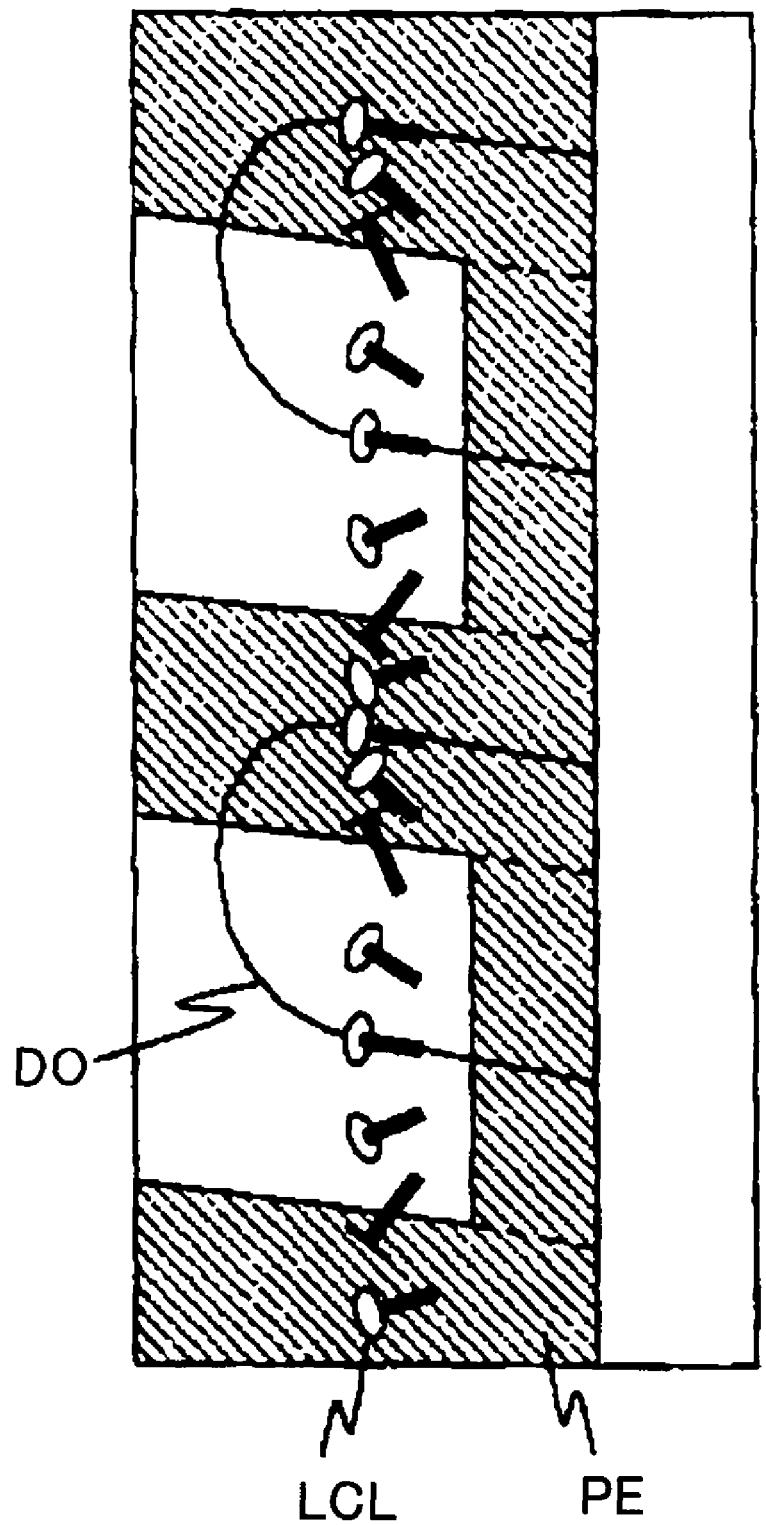

In addition, FIG. 10D shows the results of detailed examination, including the tilt angle, in terms of the state of alignment inside the domain. Here, the tilt angle rising toward the right side in FIG. 10D is defined as positive, and the tilt angle rising toward the left side is defined as negative.

It was found that there are portions where the tilt angle is positive and negative inside the domain, and the rotational angle is the maximum in the border between the two (tilt angle is 0 degrees). In addition, it was found that the area of portions where the tilt angle is positive and negative are not the same, so that the area of a portion where the tilt angle is negative is greater in FIG. 10D and the area of the portion where the tilt angle is negative is greater in FIG. 9B. The same calculation was carried out in the case where the connection portion is on the left side, and it was found that the area of the portion where the tilt angle is negative is greater, as shown in FIG. 10C.

In summary, there is inconsistency in the distribution of the tilt angle inside the domain, and the dominant tilt angle component is opposite between when the connection portion is on the left side and on the right side.

Figure 11A:
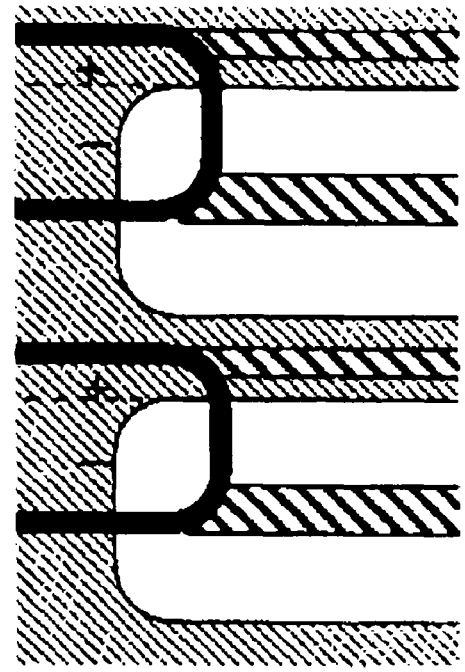
FIGS. 11A to 11C are plan diagrams showing the relationship between the domain at the linking portion end and the structure of the electrodes.
Figure 11B:
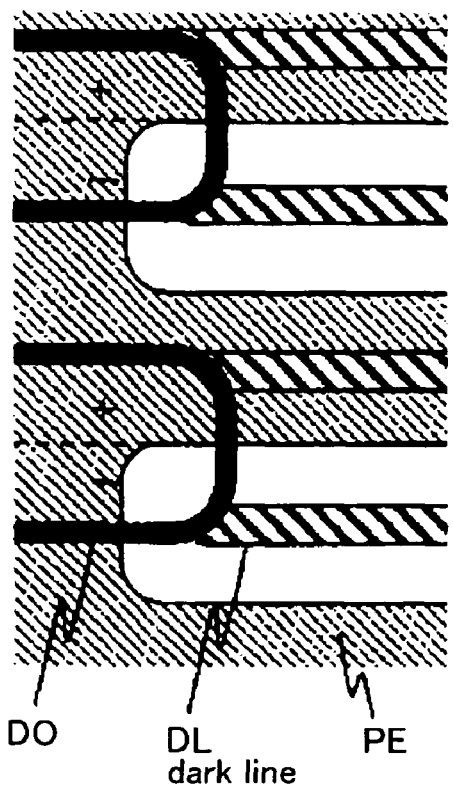
Figure 11C:
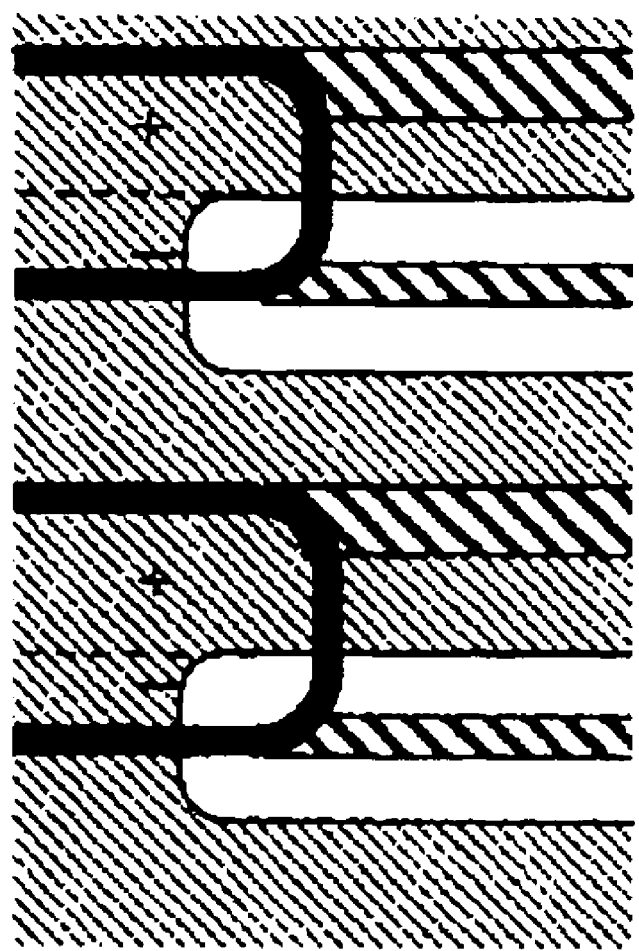

Next, the cause of the state of alignment inside the domain at an end of the connection portion having the above described properties is shown in FIGS. 11A to 11C.

FIGS. 11A to 11C show connection portions for two pitches of pixel electrodes where an end of the connection portion is on the left, and FIGS. 11A, 11B and 11C show a case where the slit width is greater than the width of the pixel electrodes, a case where the two are equal, and a case where the width of the pixel electrodes is greater than the slit width, respectively.

When the relationship between the state of alignment inside the domain at an end of the connection portion and the structure of the pixel electrodes is observed, it can be found that the border between positive and negative tilt angle regions is located in the border between the pixel electrodes and the slits, as shown by broken lines in FIGS. 11A to 11C. These are portions where the fringe electric field provides reverse rotation to the liquid crystal layer, and therefore, it seems that the rotational angle becomes the maximum. In addition, as described above, the location of the domain at an end of the connection portion relates to the electrode structure, and the straight line portions of the lying down U shape are located in the center portion of the pixel electrode and in the center portion of the slit which are close to each other. The transmittance becomes the minimum in the center portion of the pixel electrode and the center portion of the slit, and therefore, they are observed as dark lines, though not as clearly as in the domain at an end of the connection portion.

The domain at an end of the connection portion is distributed from the center portion of the pixel electrode to the center portion of the slit, which are close to each other, and the border between the positive and negative tilt angle regions is located in the border between the pixel electrode and the slit. Therefore, unless the width of the electrodes and the width of the slits are the same, there is inconsistency in the distribution of the tilt angle inside the domain at an end of the connection portion, as shown in FIGS. 11A and 11C. In addition, in the case where the width of the electrodes and the width of the slits are the same, there is no inconsistency in the distribution of the tilt angle inside the domain at an end of the connection portion, as shown in FIG. 11B.

Meanwhile, the transmittance-applied voltage properties (B-V properties) of IPS-Pro type liquid crystal display devices depend on the ratio of the width of electrodes to the width of slits. Furthermore, when this is 2:3, the transmittance in the low voltage region increases, and the fluctuation in the B-V properties becomes small relative to the fluctuation in the ratio of the width of electrodes to the width of slits. In order to increase the transmittance, the ratio of the width of electrodes to the width of slits should be made uneven in IPS-Pro type liquid crystal displays, so that the latter becomes greater, and concretely, the above described ratio should be set close to 2:3. At this time, there is inconsistency in the distribution of the tilt angle inside the domain at an end of the connection portion, for the above described reasons.

In the present invention, it is attempted to control the size of the domain at an end of the connection portion with a pretilt angle, using the above described inconsistency in the distribution of the tilt angle inside the domain at an end of the connection portion. The principle is described in the following.

Figure 12:
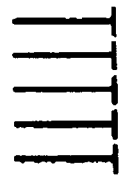
FIG. 12 is a schematic diagram illustrating the mutual effects between twisting deformation and spray deformation.
Figure 12:
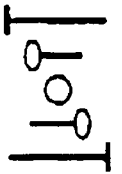
Figure 12:
Figure 12:
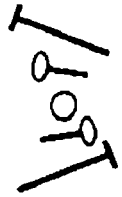
Figure 12:
Figure 12:

First, the mutual working effects of deformation in the liquid crystal are shown in FIG. 12. Deformation in the liquid crystal layer includes twist deformation and spray deformation, but tilt deformation and spray definition are independent of each other when the tilt angle on the upper and lower end surface of the liquid crystal layer that is focused on is 0 degrees. FIG. 12 shows a case where the twist angle is 180 degrees as an example of the case where there is twist deformation.

As shown in FIGS. 12A and 12B, in the case where the tilt angle on the upper and lower end surfaces of the liquid crystal layer which is focused on is 0 degrees, there is no spray deformation due to a twist angle, regardless of whether the twist angle is 0 degrees or 180 degrees. Unless the tilt angle is 0 degrees, however, the twist deformation and the spray deformation relate to each other. In the case where the tilt angle has the same symbol on the upper and lower end surface of the liquid crystal layer, as shown in FIGS. 12C and 12D, the spray deformation increases as the twist angle increases. In the case where the tilt angle has opposite symbols on the upper and lower end surface of the liquid crystal layer, as shown in FIGS. 12E and 12F, there is less spray deformation as the twist angle increases.

Figure 13:
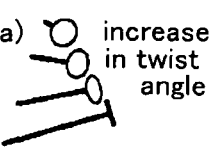
FIG. 13 is a schematic diagram illustrating change in the state of alignment due to the change in the relationship between the tilt angle inside the domain at the linking portion end and the pretilt angle in the interface with the liquid crystal layer close to the electrodes.

The relationship between the tilt angle inside the domain at an end of the connection portion and the pretilt angle in the interface of the liquid crystal layer close to the electrodes is found from the above, and shown in FIG. 13. FIG. 13 shows four combinations where the tilt angle on the upper and lower end surface is positive and negative, respectively, and cases where the tilt angles are all 0 degrees.

In this case, the upper and lower surface of the liquid crystal layer, which are focused on, are the portion where the fringe electric field is strongest and the interface with the liquid crystal close to the electrodes, respectively. In particular, the latter tilt angle corresponds to a pretilt angle. When a voltage is applied, twist deformation and spray deformation simultaneously occur in the liquid crystal layer, and k11 is usually two or more times greater than k22, and therefore, the twist angle changes so as to mitigate sudden spray deformation.

The manner in which the twist angle changes at this time is different, depending on the symbol of the pretilt angle. When a case where the tilt angle on the upper and lower end surface shown in FIG. 13C is 0 degrees is used as a reference, the twist angle increases so as to mitigate spray deformation, as shown in FIGS. 13A and 13E, in the case where the tilt angle and the pretilt angle inside the domain at an end of the connection portion have the same symbol. In the case where they have opposite symbols, the twist angle becomes smaller, as shown in FIGS. 13B and 13D.

Furthermore, the direction of alignment of the liquid crystal layer changes continuously, and therefore, the size of the domain at an end of the connection portion changes in accordance with the size of the twist angle. As described above, the twist alignment inside the domain is reverse twist, and therefore, there is a portion where the alignment does not change relative to the surrounding normal liquid crystal alignment. This portion becomes a dark line when observed as the domain at an end of the connection portion, and the portion having no change in the alignment is pressed toward the normal alignment side as the reverse twist angle inside the domain at an end of the connection portion is greater, and as a result, the domain at an end of the connection portion expands. As described above, the distribution of the domain is in lying down U shape, and the linear portions in the U shape extend outward as the domain at an end of the connection portion expands. When the reverse twist angle is small, the domain at an end of the connection portion shrinks, so that the linear portions of the U shape shorten.

Figure 14:
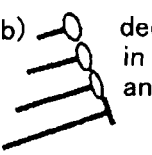
FIG. 14 is a schematic diagram illustrating a change in the size of the domain at the linking portion end caused by a change in the pretilt angle.

Change in the size of the domain at an end of the connection portion due to the pretilt angle in cases where the domain at an end of the connection portion is on the right and on the left are shown in FIG. 14. The symbols in FIG. 14 are symbols for the tilt angle in the portion where the fringe electrical field is strongest. There are portions where the tilt angle is positive and negative inside the domain at an end of the connection portion, and the effects of expansion and shrinking are set off in the case where the two have the same area, and thus, the size of the domain at an end of the connection portion does not change, irrespectively of the pretilt angle.

In reality, however, the ratio of the width of the electrodes to the width of the slits is set uneven, in order to increase the transmittance, and therefore, one of the two becomes dominant. One of the two expands with the symbol opposite to that of the pretilt angle, while the other shrinks with the symbol opposite to that of the pretilt angle, and the size of the entirety of the domain at an end of the connection portion becomes approximately the sum of the two. Therefore, the size of the domain at an end of the connection portion as a whole is determined by the dominant component.

In the case of a polyimide based alignment layer on which an alignment process is carried out using a rubbing process, a pretilt angle is inevitably provided to the nearby liquid crystal layer, and it is effective to reduce the pretilt angle in order to increase the view angle properties at the time of black display. Taking this into account, the pretilt angle is set to approximately 1.5 degrees, and even in the case where the pretilt angle is relatively small, as in this case, the size of the domain changes, as described above, depending on the symbol. In addition, the absolute value of the pretilt angle barely changes the size of the domain, and therefore, whether the symbols of the tilt angle in the portion where the fringe electric field is strongest and the pretilt angle are the same or opposite should be focused on in order to control the domain.

In the case where the connection portion is on the fight side, the portion where the tilt angle is positive becomes dominant in the domain at an end of the connection portion, and therefore, the domain at an end of the connection portion shrinks, as shown in FIG. 14B, when the conditions for rubbing are set so that the pretilt angle is positive. In the case where the connection portion is on the left side, the portion where the tilt angle is negative becomes dominant, and therefore, the domain at an end of the connection portion shrinks, as shown in FIG. 14E, when the conditions for rubbing are set so that the pretilt angle is negative.

Figure 1:
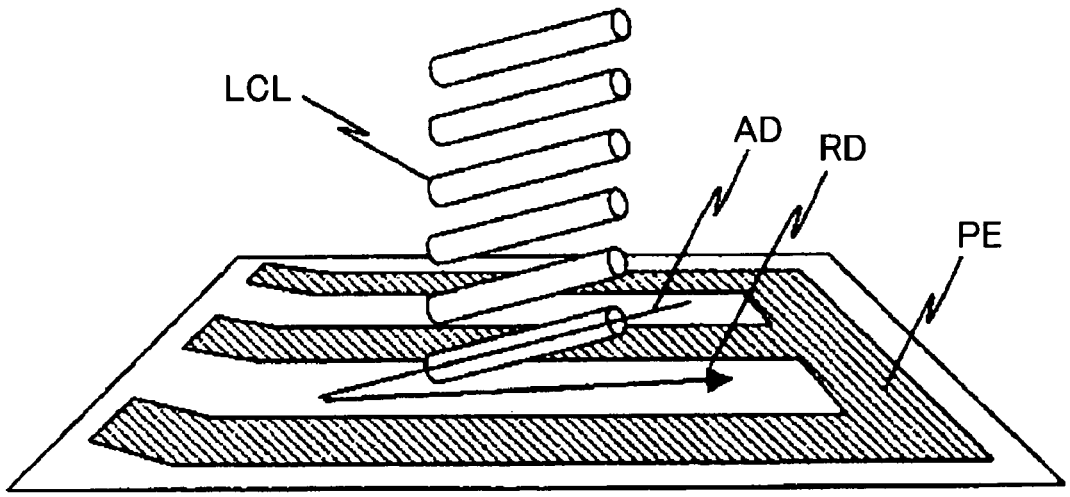
FIG. 1 is a perspective diagram showing a pretilt angle that is appropriate for preventing domain at the linking portion end in a pixel electrode having a comb-like structure.

The above described relationship between the form of the pixel electrodes and the tilt angle in the liquid crystal layer is shown in FIG. 1.

FIG. 1 corresponds to FIG. 14B, and the domain at an end of the connection portion can be controlled in an electrode structure where the connection portion is only on one side in the case where the pretilt angle is set so as to rise from the end of the comb teeth of the pixel electrodes toward the root.

The domain at an end of the connection portion causes an afterimage for a short period of time, due to application of a high voltage or stimulus from the outside. That is to say, a stimulus expands the domain at an end of the pixel to the center portion of the pixel. It takes time for the expanded domain to return to its original size after the stimulus is removed, and therefore, this can be observed as an afterimage for a short period of time. Control of the domain at an end of the connection portion through the above described setting of the pretilt angle is effective for preventing an afterimage to which these domains relate.

Here, the symbol of the pretilt angle can be evaluated by observing the view angle properties at the time of dark display. The absorption axes of the first polarizer and the second polarizer are in such locations as to cross at a right angle when observed in the direction of the normal, and thus, the transmittance in the dark display is reduced. When observed from a diagonal direction, however, the relationship between the two polarizers which cross at a right angle changes, and thus, the transmittance increases, as described in the Non-Patent Document: "Asia Display/IDW, '01 Proceedings" by T. Ishinabe, T. Miyashita, T. Uchida and Y. Fujimura, on pages 485 to 488. In particular, increase in the transmittance is significant in the direction of the azimuth that forms an angle of 45 degrees with the absorption axis of the polarizer. That is to say, regions of high transmittance and low transmittance in the view angle properties of the transmittance in dark display are distributed in such a manner that the period of the azimuth 90 degrees.

Figure 15A:
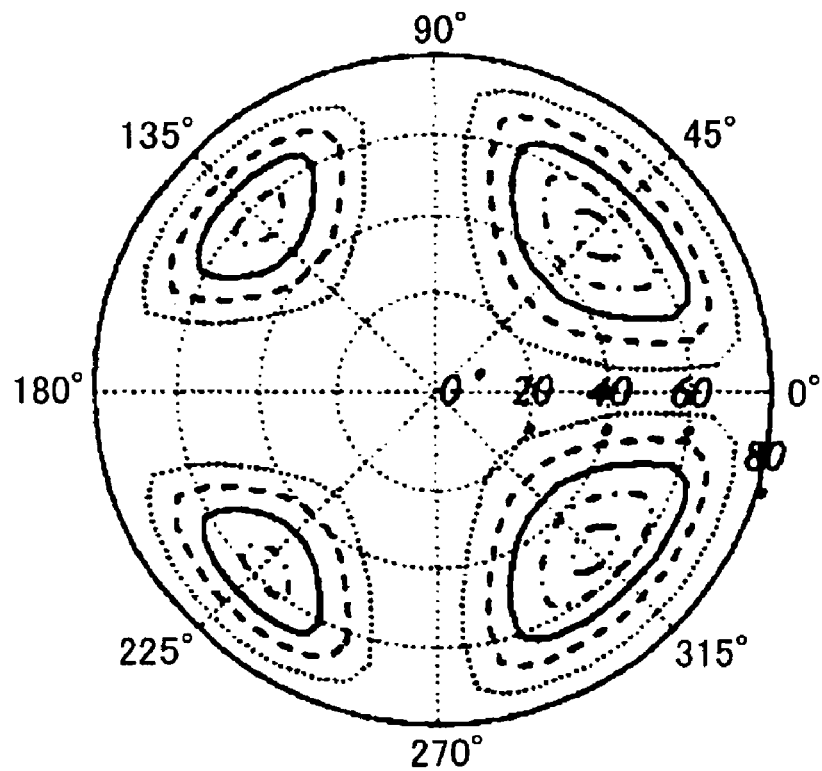
FIGS. 15A to 15C are schematic diagrams illustrating the relationship between the symbol of the pretilt angle and the view angle properties at the time of dark display.
Figure 15B:
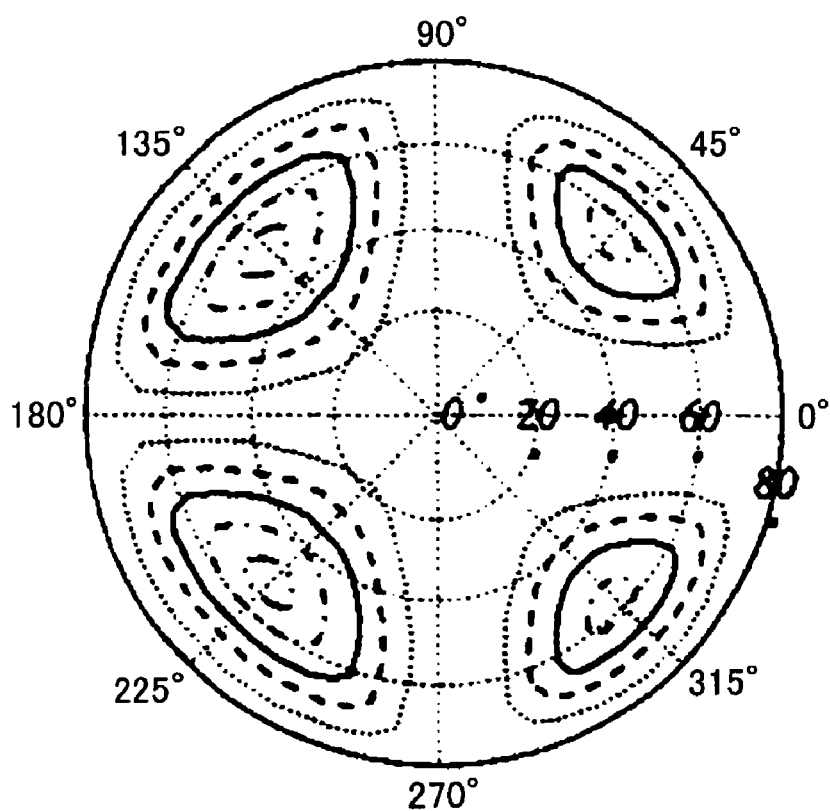
Figure 15C:
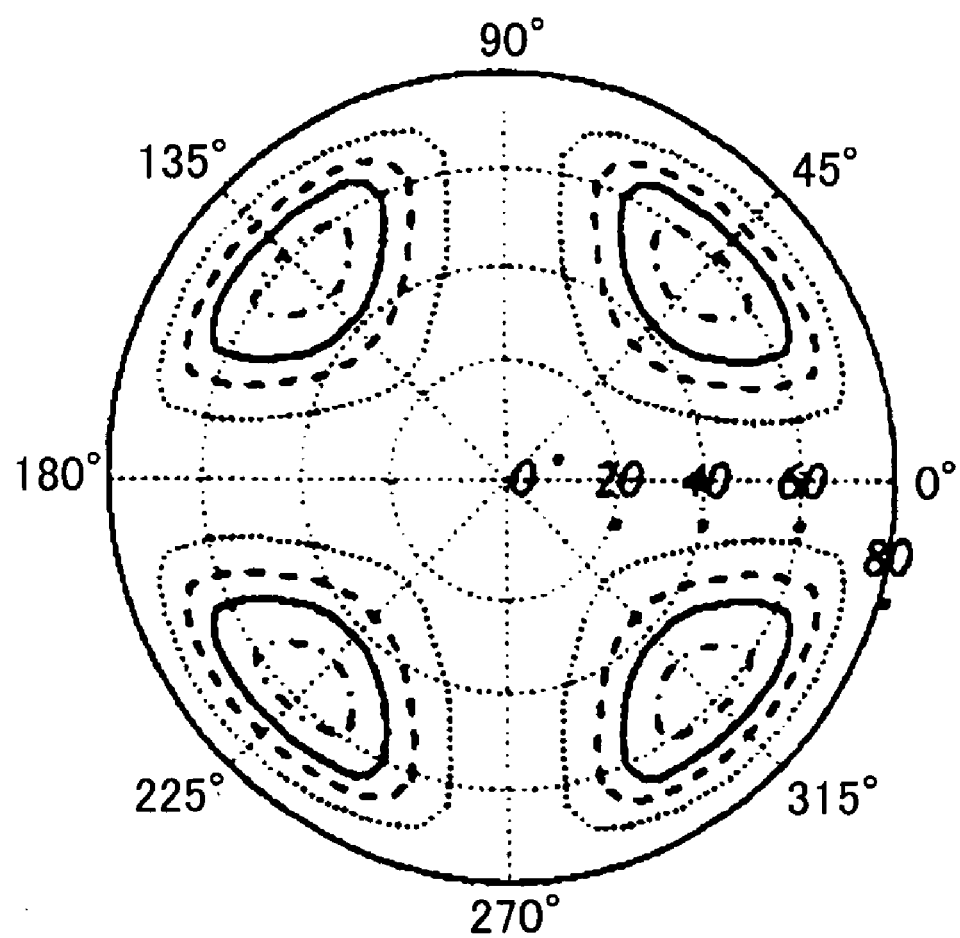

FIGS. 15A to 15C show the dependency of the view angle properties at the time of dark display on the pretilt angle in an IPS type liquid crystal display device. In FIGS. 15A to 15C, italics is polar angles and regular print is azimuths. When the pretilt angle is 0 degrees, as shown in FIG. 15C, the view angle properties are symmetrical at the time of dark display, whereas when the pretilt angle is no 0 degrees, as shown in FIGS. 15A and 15B, the view angle properties become asymmetrical. At this time, the direction in which the transmittance increases is the direction in which the pretilt angle rises. In FIGS. 15A to 15C, the liquid crystal layer has homogenous alignment, and the horizontal direction is the direction of liquid crystal alignment, and FIGS. 15A and 15B show cases where the pretilt angle is positive and negative, respectively. In order to reduce the transmittance in the direction of the view angle at the time of dark display, a phase plate is sometimes layered between the polarizers and the liquid crystal display panel, as in the above described Non-Patent Document, and in this case also, the distribution of the transmittance shown in FIGS. 15A to 15C can be maintained.

IPS-Pro type liquid crystal display devices having an electrode structure where the connection portion is only on one side are fabricated taking the above into consideration. The end of the comb teeth prevents a domain with a diagonal slit structure. In addition, the pretilt angle of the liquid crystal layer close to the pixel electrodes is set so as to rise from the end of the comb teeth toward the root, and thus, the domain at an end of the connection portion can be controlled. The control portion is on the right side in the present embodiment, and therefore, rubbing conditions are set so that the pretilt angle becomes positive.

The domain is controlled at the two ends of the pixels in accordance with the above described measures, and thus, an increase of 5% or more can be achieved in the transmittance, as compared to in IPS-Pro type liquid crystal display devices having a pixel structure where a connection portion is provided at two ends of the pixels, and at the same time, an afterimage relating to the domain can be prevented.

COMPARATIVE EXAMPLE 1

When the pretilt angle in the interface with the liquid crystal layer close to the electrodes is plus in the pixel electrodes having a slit structure with connection portions on both sides, the domain at an end of the pixel on the right side shrinks, while the domain at an end of the pixel on the left side expands. When the pretilt angle is minus, the domain at an end of the pixel on the left side shrinks, while the domain at an end of the pixel on the right side expands. Therefore, even when the symbol of the pretilt angle is changed, the transmittance does not change.

As described above, in the pixel structure having connection portions on both sides, when one domain shrinks, the other expands in response to the symbol of the pretilt angle in the interface with the liquid crystal layer close to the electrode. This is because dominant tilt angle components are opposite in the domains at the left end and the right end, as described in the first embodiment.

As described above, control of domains due to the symbol of the pretilt angle is effective in pixel structures having a connection portion only on one side. In addition, an object of the present invention is to increase the transmittance in IPS-Pro type liquid crystal display devices, and the pixel structure having connection portions on both sides has an ineffective region with a large area, and thus, it is disadvantageous to increase the transmittance with respect to this point.

COMPARATIVE EXAMPLE 2

The width of the pixel electrodes and the width of the slits are both 3 μm in the pixel structure having a connection portion only on one side, as in the first embodiment. At this time, regardless of whether the pretilt angle in the interface with the liquid crystal layer close to the electrode is plus or minus, the size of the domain at an end of the connection portion does not change. Therefore, even when the symbol of the pretilt angle is changed, such effects as increase in the transmittance cannot be gained.

This is because the plus component of the tilt angle and the minus component of the tilt angle have the same area inside the domain, as described in the first embodiment in reference to FIG. 11B, and thus, the effects of expansion and shrinkage of the domain through adjustment of the plus component of the tilt angle are offset within the domain.

As described above, control of the domain by the symbol of the pretilt angle is effective in pixel structures where the width of the pixel electrodes and the width of the slits are not the same. In addition, an object of the present invention is to increase the transmittance in IPS-Pro type liquid crystal display devices, and in the case where the width of the pixel electrodes and the width of the slits are the same, the electric field applied to the liquid crystal layer is not uniform. Therefore, the electric field applied to the liquid crystal layer has a high density in the slit portions and a low density on the electrodes. Particularly, change in the alignment of the liquid crystal layer on the electrodes is small, and therefore, the transmittance is lower in the electrode portions. Regarding this point also, the pixel structure where the width of the pixel electrodes and the width of the slits are the same is disadvantageous for increasing the transmittance of IPS-Pro type liquid crystal display devices.

Second Embodiment

In the first embodiment, the distribution of the tilt angle in the direction of the thickness of the liquid crystal layer is mainly examined, and the relationship between the tilt angle of the portion where the fringe electrical field is strongest and the pretilt angle in the interface close to the electrode is focused on.

In the present embodiment, the distribution of the alignment in a plane parallel to the liquid crystal layer is focused on, and the distribution of the alignment when a domain appears at an end of the connection portion is schematically shown in FIGS. 10C and 10D.

FIGS. 10C and 10D are plan diagrams showing the distribution of the alignment close to the electrode which is most susceptible to change in the alignment due to the fringe electric field. The direction of the twist within the domain is opposite to that in the portion of normal alignment surrounding the domain, and when observed in the direction parallel to an end of the pixels, the portions of opposite alignment and the portions of normal alignment alternate. There are domains between portions of opposite alignment and portions of normal alignment, where there is no change in the alignment. When the alignment of the liquid crystal above and beneath the domain is observed with the domain at the center, alignments inclining in opposite directions above and beneath can be seen, and therefore, there is spray deformation between portions of opposite alignment and portions of normal alignment.

The period with which portions of opposite alignment and portions of normal alignment alternate is the same as the pitch of the comb tooth electrode, which is defined as the sum of the width of the electrodes and the width of the slits. When the width of the electrodes and the width of the slits are 2 μm and 3 μm, respectively, the pitch is 5 μm. This is approximately the same as the width of the liquid crystal layer, and the spray deformation between the portions of opposite alignment and portions of normal alignment has approximately the same steepness as the deformation in the alignment in the direction of the thickness of the liquid crystal layer when a voltage is applied to a longitudinal electric field type liquid crystal display device.

Accordingly, the domain at an end of the connection portion is susceptible to the effects of the elastic constant of the liquid crystal material, and thus can be changed by adjusting the elastic constant. Concretely, the elastic constant relating to the spray deformation is k11, and therefore, when k11 is great, the energy of alignment in a state where the domain appears at an end of the connection portion is high, which should make it difficult for the domain to appear at an end of the connection portion.

Here, the elastic constant generally affects the B-V properties of the liquid crystal display device, in addition to the domains, and therefore, it is possible for the transmittance for the applied voltage that is focused on to change. Even in the case where the domain on the connection portion side is smaller, the object of the present invention cannot be achieved when the transmittance is low, and therefore, attention must be paid to the B-V properties.

In the case of IPS-Pro type liquid crystal display devices, the deformation in alignment when a voltage is applied is mainly twist deformation, and therefore, k22 mainly relates to the transmittance-voltage properties. When k22 is high, it is difficult for the twist deformation to appear, and therefore, the B-V properties shift to the high voltage side. When the transmittance on the low voltage side is focused on instead of the value of the applied voltage Vmax for providing the maximum transmittance Tmax, the transmittance is low. In contrast, when k22 is low, twist deformation easily appears, and therefore, the B-V properties shift to the low voltage side, and the transmittance is high. As a result, when k22 is constant, the B-V properties do not shift, and the transmittance does not lower.

As described above, increase in k11 controls the domain on the connection portion side and reduction in k22 shifts the transmittance-voltage properties to the low voltage side, so that the transmittance in the low voltage range is high. Therefore, k11/k22 is an effective index for controlling the domain on the connection portion side in IPS-Pro-type liquid crystal display devices and increase the transmittance, and k11/k22 may be increased.

Meanwhile, reduction in k22 causes increase in the response time, and therefore, it should not be reduced frivolously. In the case of applications where the response time is regarded as important, in addition to the transmittance, k11 should be increased while maintaining the liquid crystal material and k22, which are used as reverences constantly, and in this case also, k11/k22 is an effective index.

In reality, it is difficult to measure k22 in comparison with k11 and k33, and therefore, there are many liquid crystal materials where the value of k11 is measured but k22 is not. In this case, it can be confirmed in accordance with the following method whether the liquid crystal material used as a reference and k11 are approximately the same. In the case where the B-V properties are characterized by the threshold voltage Ec, at which the transmittance of IPS type liquid crystal display devices starts changing when the applied voltage is increased, Ec can be represented by the following formula according to the Non-Patent Document: ASIA DISPLAY '95, by M. Oh-e, M. Ohta, S. Aratani, K. Kondo, on pages 577 to 580.

$$Ec=\pi\{k22/(\epsilon_0\Delta\epsilon)\}/d$$

In the formula, the average dielectric constant $\epsilon_0$ and the dielectric constant anisotropy $\Delta\epsilon$ are relatively easy to measure, and therefore already known for most liquid crystal materials. In addition, the thickness of the liquid crystal layer d is also easy to measure. Thus, it can be confirmed from the B-V properties whether k22 is approximately the same for liquid crystal materials of which $\epsilon_0$ and $\Delta\epsilon$ are the same as for the reference. That is to say, when the B-V properties are measured for IPS-Pro type liquid crystal cells where d and the width of the electrodes, the width of the slits and the thickness of the inter-electrode insulating film are the same, and these approximately coincide with the B-V properties of the liquid crystal material used as a reference, k22 of the liquid crystal material that is focused on is approximately the same as the liquid crystal material used as a reference.

An object of the present invention is to increase the transmittance of IPS-Pro type liquid crystal display devices by controlling the domain, and therefore, it is a prerequisite for evaluating the effects according to the present invention that factors which relate to the B-V properties but not to control of the domain all be the same, and it can be confirmed from the above whether k22 is approximately the same.

Meanwhile, the spray deformation becomes the driving force for the effects of increasing and decreasing the twist deformation inside the domain at an end of the connection portion, as shown in FIGS. 13 and 14. The higher k11 is, the stronger the effects of increasing and decreasing the twist deformation must be.

In the present embodiment, the pixel electrodes are in comb tooth form in a plane, and the domain at the end of the comb teeth is controlled by the domain controlling structure, and the domain at the domain at the end of the connection portion is controlled by the symbol of the tilt angle in the liquid crystal layer. The symbol of the tilt angle provides an effect of shrinking the domain at the end of the connection portion, as well as the effect of expanding the domain at the end of the comb teeth.

Though the domain at the end of the comb teeth is dedicatedly controlled by the domain controlling structure, it cannot be controlled when k11 is increased to a certain value, and the transmittance can be expected to lower when the domain at the end of the comb teeth grows. Thus, the transmittance does not necessarily increase as k11 increases, and it can be expected that there is an optimal range for the value of k11 in order for the transmittance to increase.

The state of alignment when a voltage is applied to a pixel electrode having a comb tooth structure was calculated for various values of k11. The domain at an end of the connection portion shrank as k11 increased, and in the end disappeared. The domain at an end portion of the comb teeth, however, behaved differently. That is to say, in the case where the value of k11 is sufficiently small, the size of the domain at the end portion of the comb teeth is almost constant, but as the value of k11 becomes greater, the domain at the end of the comb teeth expands and spreads toward the inside of the domain controlling structure.

Next, a liquid crystal material having a different value for k11 was prepared, and the transmittance on the low voltage side relative to the voltage applied to provide the maximum transmittance in the B-V properties was measured. More specifically, two liquid crystal materials having different values for k11 which provide approximately the same B-V properties when measured for IPS-Pro type liquid crystal cells were prepared, and the value of k11 was changed in smaller increments by changing the mixture ratio.

Figure 16:
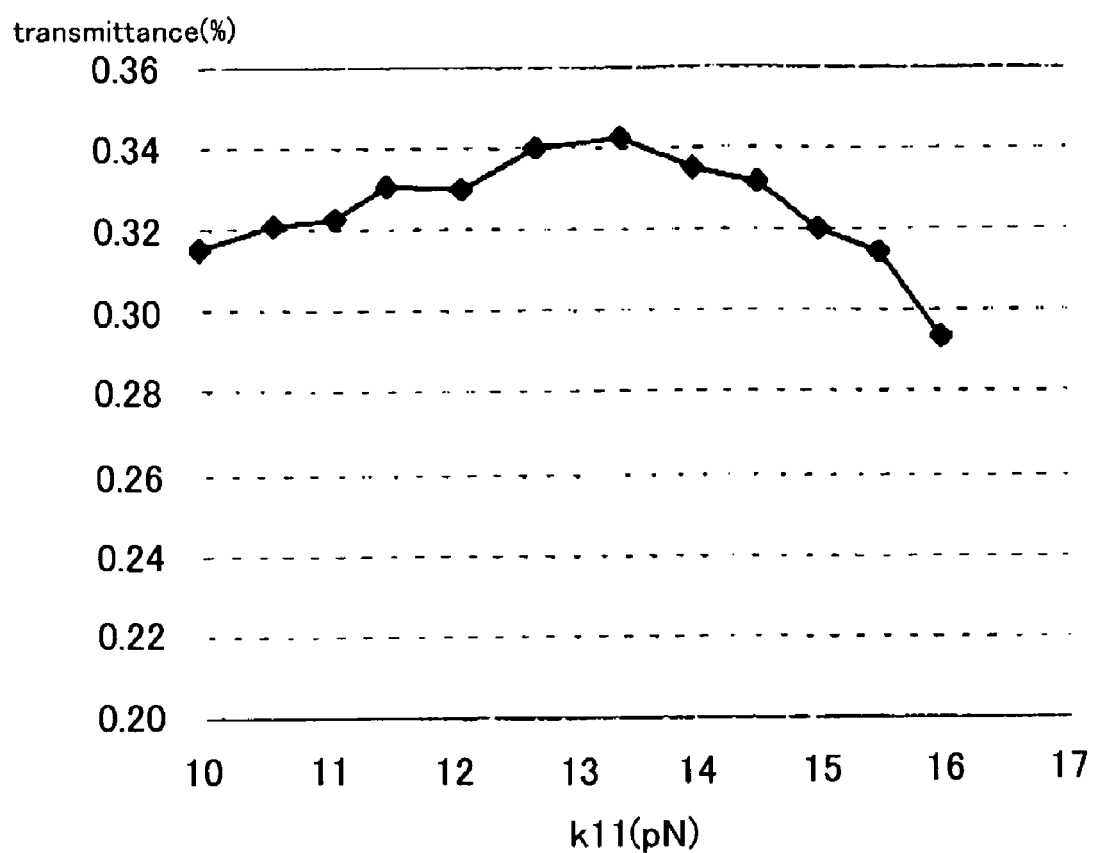
FIG. 16 is a graph showing the dependency on k11 of the transmittance.

The transmittance for an applied voltage of 4.5 V was measured for the respective liquid crystal materials, and the results shown in FIG. 16 were gained. When the value of k11 was 13.5 pN, the transmittance for an applied voltage of 4.5 V became the maximum. The transmittance decreased for a k11 of 13.5 pN or more, and when the value of k11 was 15.5 pN, approximately the same transmittance when k11 was 10 pN was gained.

In order to increase the transmittance of IPS-Pro type liquid crystal display devices as described above, there is an optimal range for the value of k11. The k11 of current liquid crystal materials is approximately 10 pN, and therefore, the optimal range for the value of k11 is 10 pN or more and 15.5 pN or less, in order to gain a transmittance equal to or greater than that of current liquid crystal materials. In addition, the k22 of current liquid crystal materials is approximately 5 pN, and therefore, the range for an elastic constant effective for increasing the transmittance of IPS-Pro type liquid crystal displays taking the shift of the B-V properties into consideration may be such that k11/k22 is 2 or more and 3.1 or less.

Third Embodiment

According to the present embodiment, focusing on the distribution of the alignment within a plane parallel to the liquid crystal layer, as in the second embodiment, the domain at an end of the connection portion is attempted to be controlled. As described in the second embodiment, there is spray deformation between portions of opposite alignment and portions of normal alignment, and the period with which portions of opposite alignment and portions of normal alignment alternate is the same as the pitch of the comb tooth electrode. As a result, the steepness of spray deformation increases as the pitch of the comb tooth electrode lowers, and therefore, the energy for alignment in a state where the domain appears at an end of the connection portion can be expected to increase. As another means for controlling the domain at an end of the connection portion, reduction in the pitch of the comb tooth electrode can be cited.

FIG. 17 shows the results of observation of the domain at the end of the connection portion, where the ratio of the width of the electrode to the width of the slits is kept at 2:3 in the comb tooth type electrode of the first embodiment, and the pretilt angle is set so as to rise from the end of the comb teeth of the pixel electrodes toward the root, and in addition, the pitch of the comb tooth electrode and the angle of alignment vary.

FIG. 17 shows the appearance of the domain at an end of the connection portion using ○, Δ and ×. × indicates a case where the domain in lying down U shape is clearly visible. Δ indicates a case where the domain in lying down U shape is not clearly visible but a portion having a low transmittance in such a shape that the lying down U shape is smaller is visible at an end portion of the pixels. ○ indicates a case where no domain is visible.

It can be confirmed from Table 1 that the smaller the pitch of the comb tooth electrode is, the more difficult it tends to be for the domain to appear at an end of the connection portion. In addition, when the angle of alignment is small, change in the alignment becomes great when a voltage is applied, and the transmittance increases, and as is known, a domain easily appears at an end of the connection portion at this time. It can be confirmed from Table 1 that when the pitch of the comb tooth electrode is small, the angle of alignment at which the domain at an end of the connection portion appears tends to shift to the smaller side.

However, the pitch of the comb tooth electrode is restricted by the manufacturing process, and higher precision processing becomes necessary as the pitch of the comb tooth electrode becomes smaller. In order to make the pitch of the comb tooth electrode smaller while keeping the ratio of the width of the electrode to the width of the slits 2:3, a pitch of approximately 3 μm is currently the limit for comb tooth electrodes. In addition, in the case where the pitch of the comb tooth electrode is made smaller while keeping the thickness of the inter-electrode insulating film constant, the component applied to the inter-electrode insulating film from among the electric field formed between the pixel electrodes and the common electrodes increases so as to become a fringe electric field with a smaller component applied to the liquid crystal layer. As described above, the transmittance of IPS-Pro type liquid crystal display devices cannot be increased simply by reducing the pitch of the comb tooth electrode.

In order to apply a sufficient voltage to the liquid crystal layer when the pitch for the comb tooth electrode is reduced, the inter-electrode insulating film must be thinner. More specifically, the thickness of the inter-electrode insulating film must be reduced in proportion to the pitch of the comb tooth electrode, and another problem arises at this time.

The common electrode in the lower layer of the inter-electrode insulating film is not completely flat, and there is some unevenness, due to foreign objects being mixed in. Therefore, when the inter-electrode insulating film is thin, the probability of a recess penetrating through the inter-electrode insulating film so that the common electrode and the pixel electrode short-circuit becomes higher, even in the case where the height of the unevenness is constant. Therefore, the lower limit for the thickness of the inter-electrode insulating film is currently approximately 0.2 μm. In order to gain a sufficient transmittance for an inter-electrode insulating film having a thickness of approximately 0.2 μm, it is necessary for the lower limit for the pitch for the comb tooth electrode to be approximately 3 μm.

In contrast, in the case where the pitch of the comb tooth electrode is great, there are no problems in the manufacturing process, as described above, but a domain tends to appear at an end of the connection portion for another reason. That is to say, when the pitch of the comb tooth electrode is great, the steepness of spray deformation in such a state that a domain appears at an end of the connection portion is lost. As a result, the energy for alignment in such a state that a domain appears at an end of the connection portion is low, even when the elastic constant of the liquid crystal layer and other conditions are the same, and therefore, a domain easily appears at an end of the connection portion.

As shown in FIG. 17, in the case where the pitch of the comb tooth electrode is 10 μm, a domain appears at an end of the connection portion, irrespectively of the angle of alignment. Therefore, the pitch of the comb tooth electrode must be 8.5 μm or less, which is smaller than in the above.

In addition, the transmittance is low in the case where the pitch of the comb tooth electrode is great, because of the properties of the fringe electric field particular to IPS-Pro type liquid crystal display devices. The electric field applied to the liquid crystal layer in the case of IPS-Pro type liquid crystal display devices is a fringe electric field generated between the common electrode and the pixel electrode separated by the inter-electrode insulating film, and located in the border between the pixel electrode and the slit portion. This is because when the pitch of the comb tooth electrode is great, the width of the electrodes and the width of the slits are also great, and therefore, the electric field has a low density in portions at a distance from the border between the pixel electrode and the slit portion, that is to say, at the center of the electrode and the center of the slit, and thus, the alignment of the liquid crystal layer in these portions changes little.

As described above, in order for the transmittance of IPS-Pro type liquid crystal display devices to increase, while controlling the domain at an end of the connection portion, the pitch of the comb tooth electrode must be within the optimal range, and the optimal range is from 3 μm to 8.5 μm.

Fourth Embodiment

The ratio of the width of the electrodes to the width of the slits in IPS-Pro type liquid crystal display devices relates to the distribution of the tilt angle inside the domain at an end of the connection portion, and it also relates to the transmittance in a portion which is sufficiently at a distance from the end portion of the pixel and has a normal twist direction.

Figure 18:
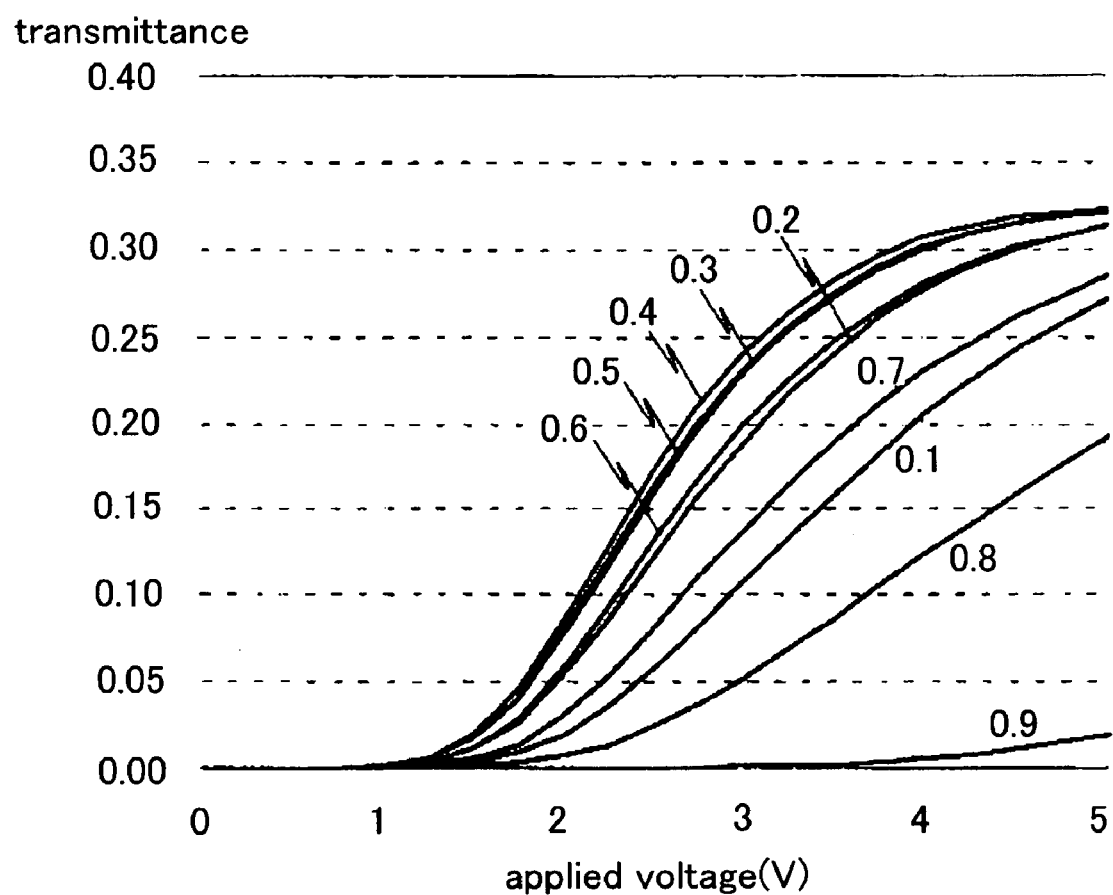
FIG. 18 is a graph showing the dependency on the ratio of the width of the electrodes to the width of the slits of the B-V properties.

In the present embodiment, the latter is examined. The pitch of the comb tooth electrode is fixed to 5 μm while the ratio of the width of the electrodes to the width of the slits varies, and the B-V properties are calculated. The results are shown in FIG. 18. Here, in the present embodiment, the ratio of the width of the electrodes to the width of the slits is represented by the electrode width ratio as defined by {width of electrodes/(width of electrodes+width of slits)}.

In FIG. 18, the electrode width ratio is changed by 0.1 in a range from 0.1 to 0.9, and the numerals in FIG. 18 indicate the electrode width ratio of the B-V properties.

When the electrode width ratio is 0.4, the B-V properties shift the most to the low voltage side, and the transmittance for the voltage on the lower voltage side of the applied voltages for providing the maximum transmittance, for example the transmittance for 4.5 V, also becomes the maximum. When the electrode width ratio shifts from this, the B-V properties shift to the high voltage side as a whole, and together with this, the transmittance for 4.5 V also lowers. When focusing on the transmittance in the low voltage region, for example the transmittance at 4 V, it becomes the maximum when the electrode width ratio is 0.4.

Figure 19A:
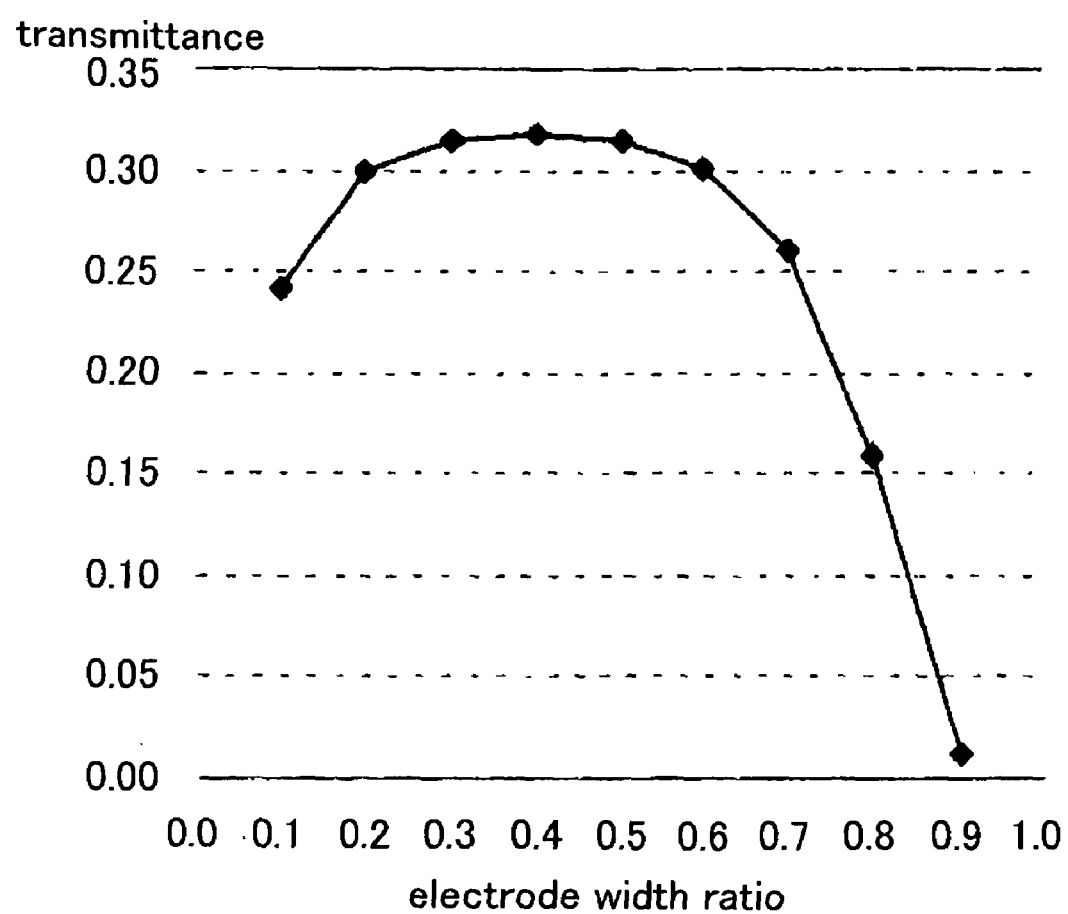
FIGS. 19A and 19B are graphs showing the dependency on the ratio of the width of the electrodes to the width of the slits of the B-V properties.

In addition, when a case where the electrode width ratio is 0.4 and a case where it is 0.5 are compared, is found that the latter B-V properties shift slightly to the high voltage side, but there is relatively little change. In the case where the electrode width ratio is 0.4 and 0.3 also, there is relatively little change. However, when the B-V properties are compared between cases where the electrode width ratio is 0.6 and 0.7, it is found that the latter greatly shifts toward the voltage side. Likewise, when the B-V properties are compared between cases where the electrode width ratio is 0.3 and 0.2, the latter shifts greatly to the high voltage side In order to quantify the above, the dependency of the transmittance for an applied voltage of 4.5 V on the width of the electrodes is shown in FIG. 19A. The transmittance for an applied voltage of 4.5 V is the maximum for an electrode width ratio of 0.4, and changes gradually as it shifts away from this.

Figure 19B:
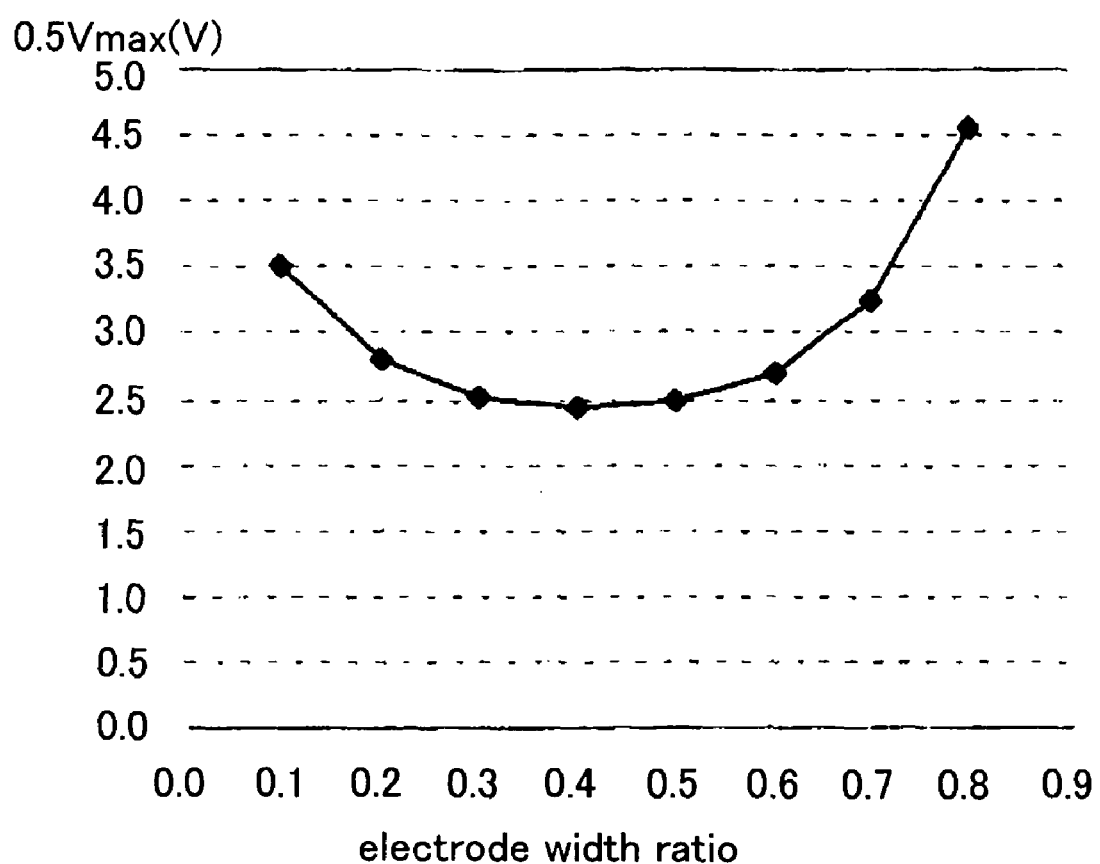

In addition, FIG. 19B shows the B-V properties in FIG. 18 when converted to an electrode width ratio of 0.5 Vmax. Here, 0.5 Vmax is the value of the applied voltage for providing in a value which is half of the maximum transmittance of the B-V properties. In FIG. 19B, 0.5 Vmax is the minimum for an electrode width ratio of 0.4, and changes gradually as it shifts away from this. That is to say, in FIG. 19B, high transmittance is provided in a low voltage range where the applied voltage is approximately 4.5 V when the electrode width ratio is close to 0.4, and the B-V properties change little, even when the electrode width ratio fluctuates. However, in FIG. 19B, the B-V properties change greatly when the electrode width ratio fluctuates, in the case where the voltage width ratio is greatly different from 0.4.

As described above, the electric field generated when a voltage is applied across the pixel electrodes and the common electrodes in IPS-Pro type liquid crystal display devices is a so-called fringe electric field, and located in the border between the pixel electrodes and the slit portions. FIGS. 19 to 21 show change in the alignment of the liquid crystal layer due to the fringe electric field, and the distribution of the transmittance.

Figure 20A:
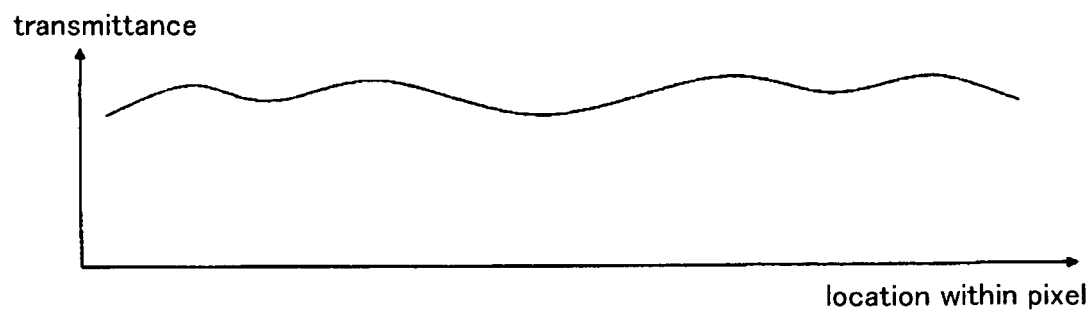
FIGS. 20A and 20B are a graph and a cross sectional diagram showing the distribution of the transmittance within the pixels in relation with the state of the alignment of the liquid crystal.
Figure 20B:
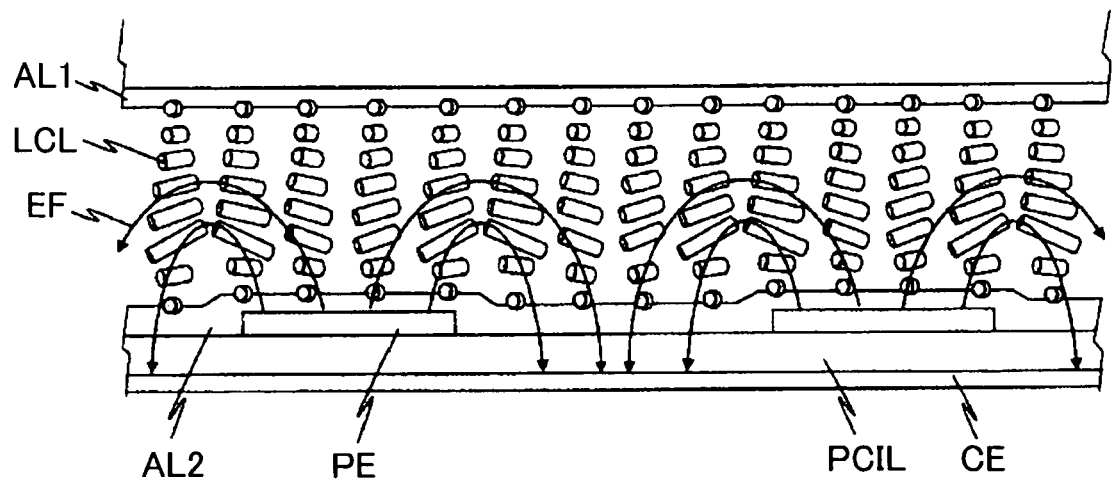

FIG. 20 shows a case where the electrode width ratio is 0.4, and shows a cross section for approximately two pitches of the comb tooth electrode. As shown in FIG. 20B, the degree of the change in the alignment is relatively constant within one pitch of the comb tooth electrode, irrespectively of the location, whether at the center of the slit, at the center of the comb tooth electrode or in the border between the slit and the comb tooth electrode. As a result, as shown in FIG. 20A, the distribution of the transmittance is also relatively constant within one pitch of the comb tooth electrode.

Figure 21A:
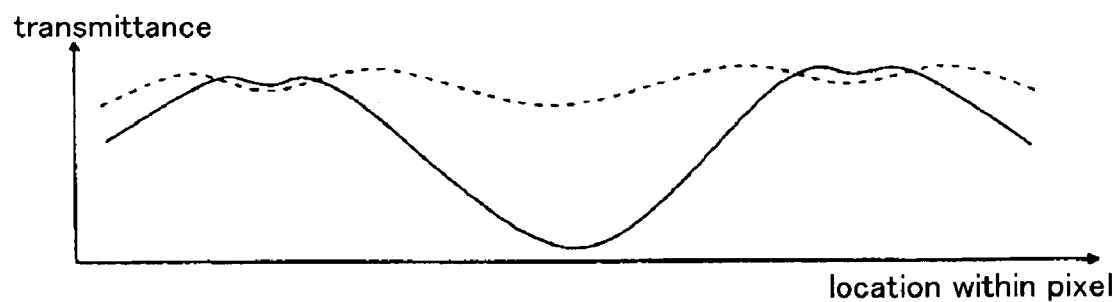
FIGS. 21A and 21B are a graph and a cross sectional diagram showing the distribution of the transmittance within the pixels in relation with the state of the alignment of the liquid crystal.
Figure 21B:
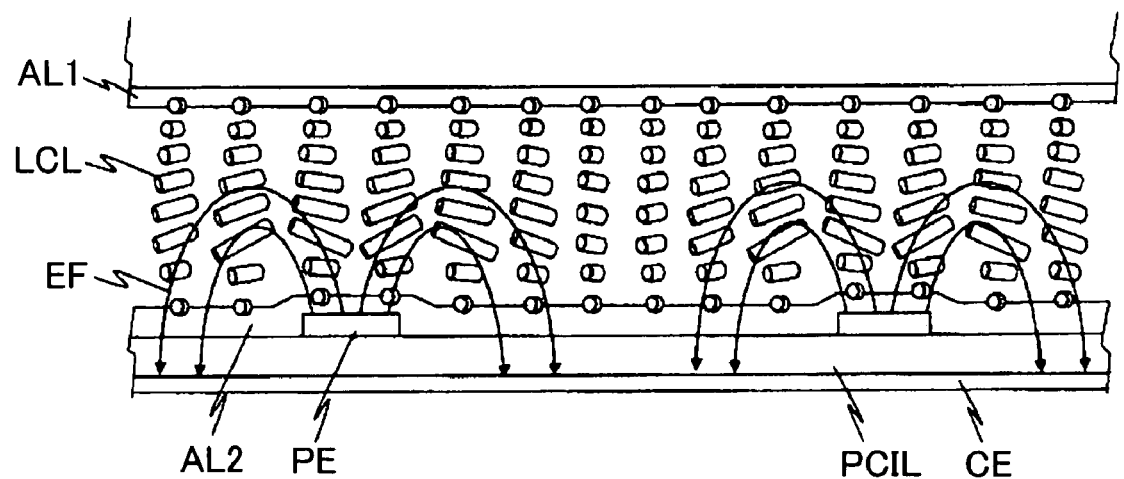

FIG. 21 shows a case where the electrode width ratio is 0.2, and as shown in FIG. 21B, the electrical field has a low density at the center of the slit, and therefore, the alignment of the liquid crystal layer at the center of the slits changes little. In addition, the distribution of the transmittance is shown by a solid line in FIG. 21A. The broken line in FIG. 21A indicates the distribution of the transmittance in the case where the electrode width ratio shown in FIG. 20A is 0.4. As shown in FIG. 21A, the transmittance decreases at the center of the slits and this provides a low transmittance even compared with the broken line. Therefore, the average transmittance within one pitch of the comb tooth electrode is also lower.

Figure 22A:
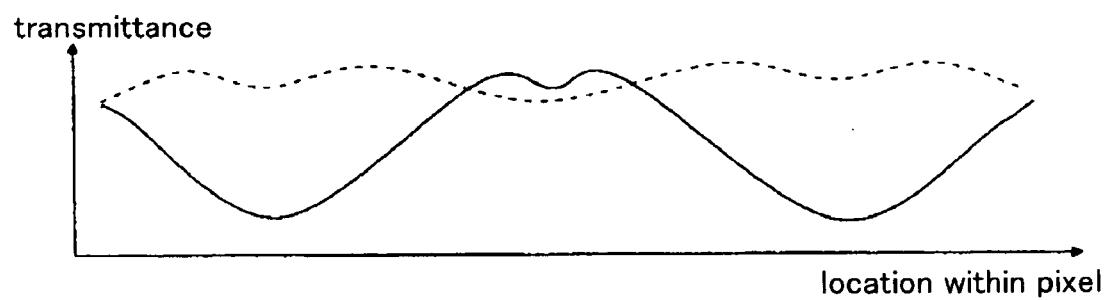
FIGS. 22A and 22B are a graph and a cross sectional diagram showing the distribution of the transmittance within the pixels in relation with the state of the alignment of the liquid crystal.
Figure 22B:
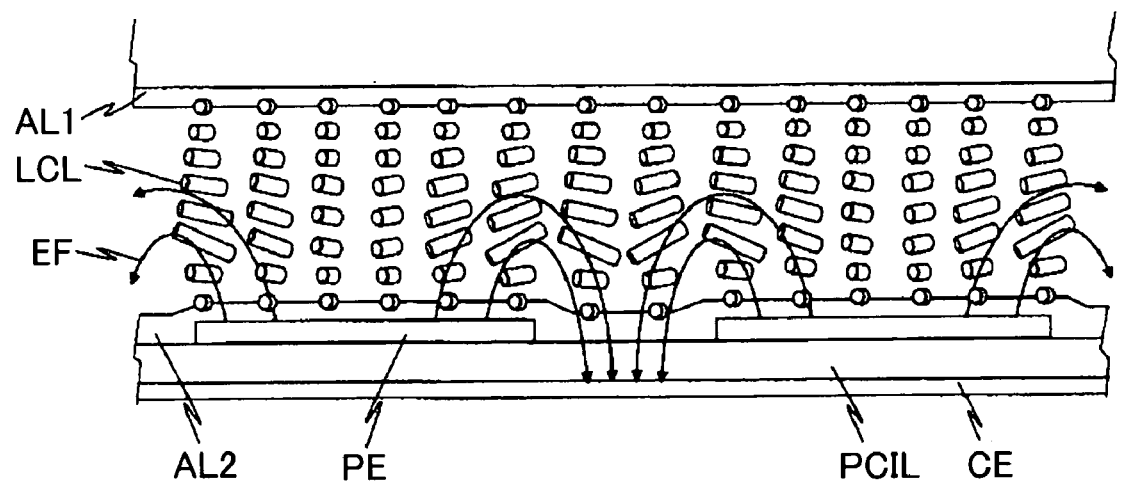

FIG. 22 shows a case where the electrode width ratio is 0.7, and the electric field has a low density at the center of the pixel electrodes, unlike in FIG. 21. As shown in FIG. 22B, the alignment of the liquid crystal layer at the center of the pixel electrodes changes little, and therefore, as shown in FIG. 22A, the transmittance is low at the center of the pixel electrodes. In this case also, the average transmittance within one pitch of the comb tooth electrode is low.

In IPS-Pro type liquid crystal display devices, the electrodes in the lower layer are portions of a sheet of electrodes in a plane, and in the present embodiment, the common electrodes are in the lower layer. The common electrodes are close to the liquid crystal layer with the inter-electrode insulating film in slit portions in between, and therefore, the slit portions are openings through which lines of electric force come out. Therefore, the distribution of the fringe electric field becomes uniform within the pixels when the electrode width ratio is 0.4, which is slightly smaller than 0.5.

As described above, the electrode width ratio is set to a value close to 0.4, and thus, the transmittance in a portion at a distance from an end portion of the pixels can be increased. As is clear from FIGS. 19, taking only the B-V properties into consideration, the optimal range for the electrode width ratio is from 0.3 to 0.5. When the electrode width ratio is 0.5, however, the effects of controlling the domain at an end of the connection portion cannot be gained by setting the pretilt angle, as shown in Comparative Example 2, and therefore, the optimal range for the electrode width ratio is from 0.3 to 0.45. At this time, the distribution of the tilt angle within the domain at an end of the connection portion becomes uneven, and the pretilt angle in the interface with the liquid crystal close to the electrodes is optimized using this, and thus, the domain at an end of the connection portion is controlled, so that further increase in the transmittance can be achieved.

Fifth Embodiment

Figure 23A:
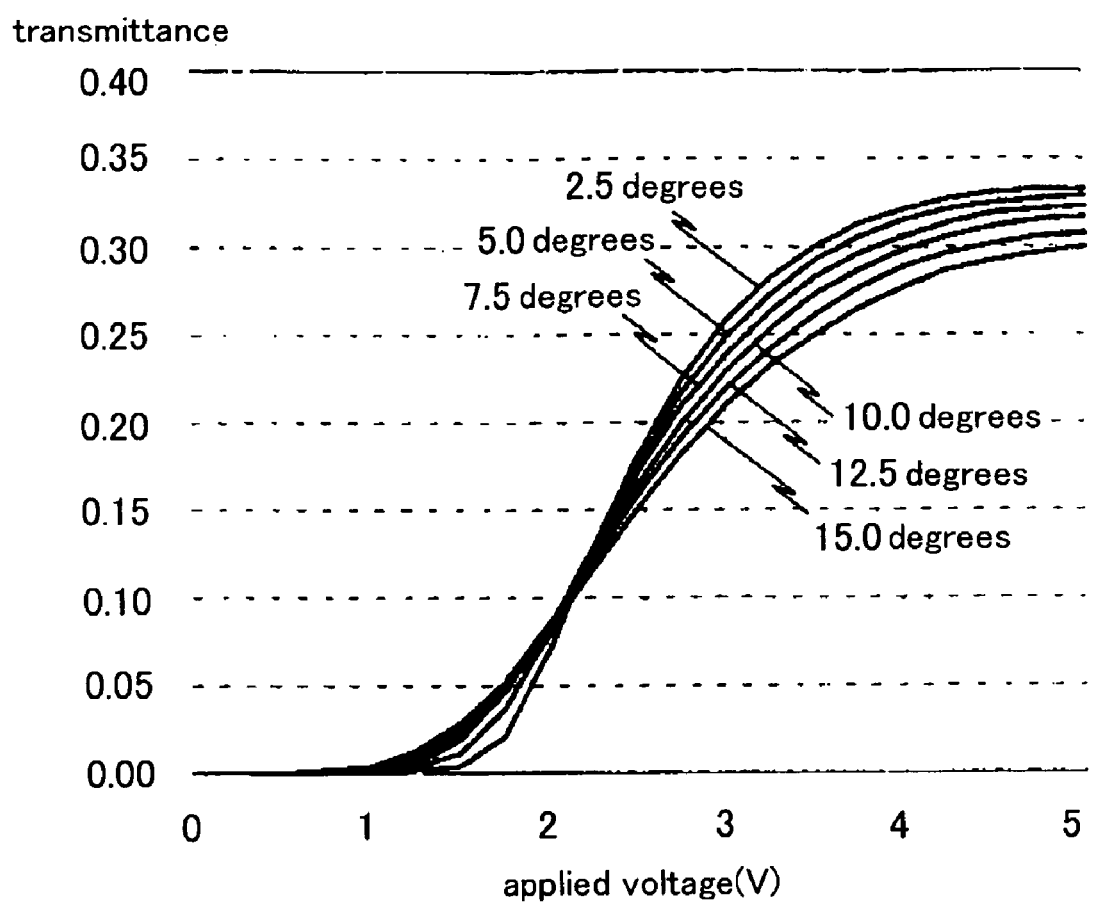
FIGS. 23A and 23B are graphs showing the dependency on the angle of alignment of the B-V properties.
Figure 23B:
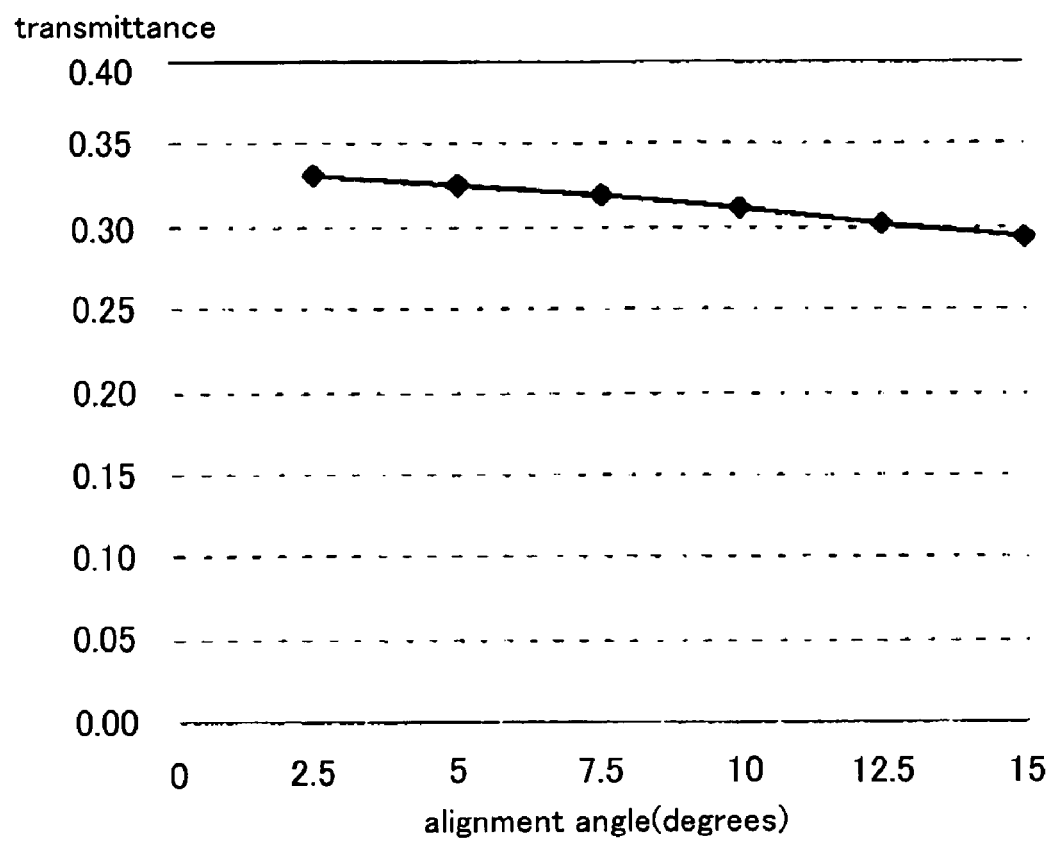

The transmittance in a portion which is sufficiently at a distance from an end portion of the pixel within the pixel and having a normal twist direction is examined, as in the fourth embodiment. The transmittance depends on the direction of alignment of the liquid crystal, and when the angle between the direction of the stripes in the comb tooth electrode and the direction of alignment is the alignment angle, the dependency of the B-V properties on the alignment angle in an ideal case, in which the stripes of the pixel electrodes extend infinitely, is calculated. The results are shown in FIG. 23. The numerals in FIG. 23 indicate alignment angles in IPS-Pro type liquid crystal display devices for which the B-V properties are calculated. The lower the alignment angle is, the steeper the B-V properties are, and the higher the maximum transmittance is.

The B-V properties become steep when the torque applied to the liquid crystal layer is low due to the electric field, and thus, the alignment changes at a higher voltage. In addition, the maximum transmittance increases for the following reasons. When a voltage is applied, the alignment of the liquid crystal layer changes to close to parallel to the direction of the fringe electric field, while the angle formed between the direction of the alignment of the liquid crystal and the direction of the fringe electric field becomes close to 90°, and therefore, the direction of alignment when a voltage is applied changes greatly. Focusing on the transmittance on the low voltage side relative to the applied voltage for providing maximum transmittance, the smaller the alignment angle is, the higher the transmittance is.

The above is an ideal case, in which the stripes of the pixel electrodes extend infinitely, and in reality, the effects of the end portions of the pixels must be taken into consideration. In the end portions of the pixels, the smaller the alignment is, the easier a domain is generated at an end of the connection portion. This is because the area of the portion for providing reverse twist alignment to the liquid crystal layer increases in the end portions of the pixel electrodes, where acute angles are lost. In addition, there is little difference in energy between normal twist and reverse twist alignment, even in portions sufficiently at a distance from the end portion of the pixel.

For the above reasons, the limit for increase in the transmittance due to lowering of the alignment angle is currently approximately 5 degrees, and when the alignment angle is smaller than 5 degrees, the domain at an end of the connection portion significantly expands, and the transmittance lowers. In extreme cases, when a high voltage is applied for bright display or the like, the domain at an end of the connection portion extends to the center of the pixel, and when gradation is switched, it takes time for the domain to shrink, and an afterimage may be visible.

The domain at an end of the connection portion can be controlled when the alignment angle is low by increasing k11/k22 and optimizing the symbol of the pretilt angle. That is to say, the state of alignment of the liquid crystal within the domain at an end of the connection portion has the same properties as in the first embodiment when the alignment angle is small. Therefore, measures which are effective for controlling the domain at an end of the connection portion in the first embodiment are also effective when the alignment angle is small. As a result, an alignment angle of smaller than 5 degrees, which is currently the limit, becomes possible, and thus, the transmittance can be increased.

For example, the pretilt angle may be set so as to rise from the end of the comb teeth toward the roots and k11/k22 increased to approximately 3, and thus, no afterimage is visible due to expansion of the domain at an end of the connection portion, even when the alignment angle is 3 degrees, and the transmittance is higher than in the case where the alignment angle is 5 degrees.

Sixth Embodiment

The portion of the pixel electrode which provides reverse twist alignment in the liquid crystal layer expands as acute angles in the pixel end portions disappear and are rounded. When many of the acute angles in the pixel end portions disappear, reverse twist alignment overcomes the force for regulating the alignment from surrounding portions for normal alignment and grow in the direction of the thickness of the liquid crystal layer, and easily become a domain. Therefore, the pixel electrodes are processed using higher precision process, and thus, pixel electrodes of which the form is closer to square with little loss of acute angles can be gained.

Figure 24A:
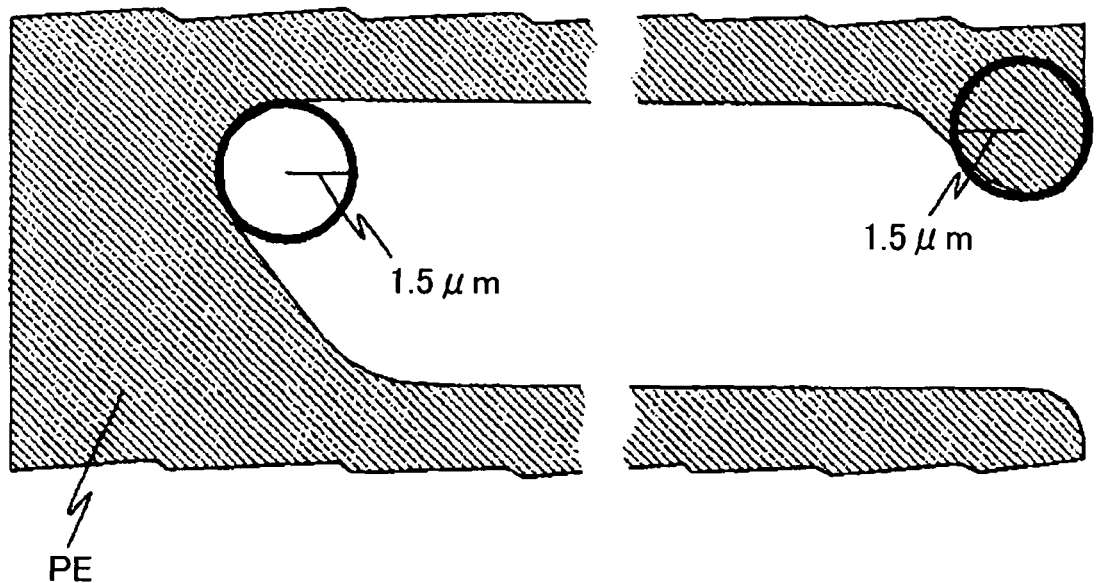
FIGS. 24A and 24B are plan diagrams showing the variation in the form of the pixel electrodes due to a difference in processing.
Figure 24B:
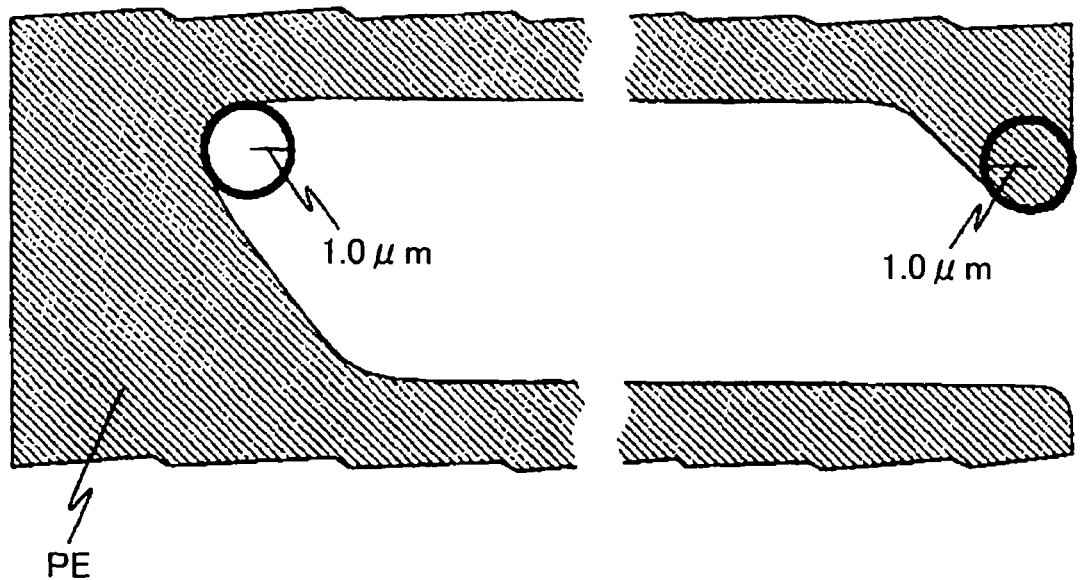

Concretely, there are processes using a g line from a mercury lamp for exposing a resist, as well as processes using an i line of a shorter wavelength, but a higher precision process can be carried out using the latter. There is a route in the comb tooth structure on the connection portion side, and this becomes of a rounded form when acute angles disappear. When the comb tooth electrode is observed using a microscope, the width of the electrodes and the width of the slits are approximately 2 μm and 3 μm, respectively, after processing. Furthermore, the rounded ends and the routes in the comb tooth structure are observed. The results are shown in FIG. 24. When rounding of the ends and roots in the comb tooth structure is represented by the radius of an inscribed circle, the radius is approximately 1.5 μm for the g line process, as shown by the thick circle in FIG. 24A, and approximately 1.0 μm for the i line process, as shown by the thick circle in FIG. 24B.

In the products resulting from the g line process, no afterimage is visible due to the expansion of the domain when the alignment angle is 5 degrees, while an afterimage is visible when the alignment angle is 3 degrees. In contrast, in products resulting from the i line process, no afterimage is visible due to expansion of the domain even when the alignment angle is 3 degrees.

Acute angles in the end portion of the pixel electrodes are prevented from disappearing under such conditions that a domain is more easily generated at an end of the pixels. Measures for increasing the transmittance often trade off the domain at an end of the pixels, and lowering of the alignment angle corresponds to this. The domain on the connection end side is prevented from expanding, and thus, it becomes possible to lower the alignment angle, and higher transmittance can be achieved.

Seventh Embodiment

In the pixel electrode shown in FIG. 3, there are two regions within each pixel where the direction of rotation of the alignment of liquid crystal is different when a voltage is applied, so that more colorless display can be achieved in the view angle direction. When slits having the same width but different inclinations are created inside the rectangular pixel electrodes, as described above, the center of the pixels becomes the border between the two regions, and a triangular ineffective region where no voltage can be applied to the liquid crystal layer is created.

There are opaque components, such as contact holes, TFT's, scanning lines and the like, within each pixel, and when these components are arranged in the border portion, the ineffective region can be used effectively.

Figure 25:
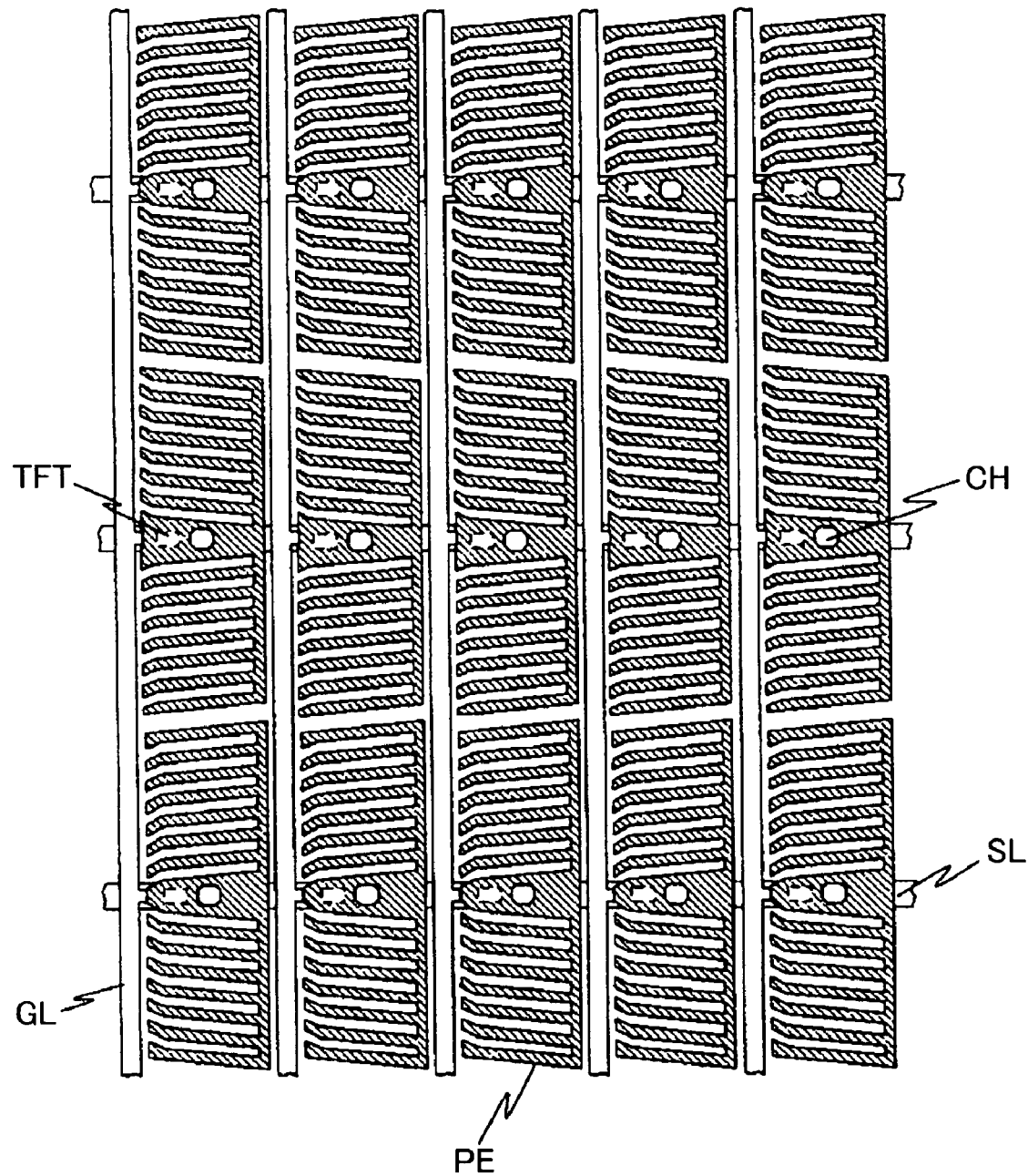
FIG. 25 is a plan diagram showing an example of the alignment of pixel electrodes having two regions arranged where the alignment of liquid crystal rotates in different directions when a voltage is applied.

Meanwhile, there is an ineffective region where the electrode is wide and no fringe electric field is applied to the liquid crystal layer in an end portion of the pixels. These ineffective regions can be removed when the electric field in the pixels is trapezoid, as shown in FIG. 25. When the electric field in the pixels is trapezoid, the borders between adjacent pixel electrodes are serrated in FIG. 25, but the scanning lines pass through the lower layer of the border portion between the two regions at the center of the eh pixels, and therefore, the scanning lines are straight.

In addition, the pixel electrode structure is a comb tooth structure, in order to prevent a domain at the end of a connection portion, and the end of connection portions are aligned on the same side for all of the pixels. Concretely, pixel electrodes where the connection portion is arranged on the top side of a trapezoid and pixel electrodes where the connection portion is arranged on the bottom side of a trapezoid alternate, as shown in FIG. 25. As a result, ineffective regions resulting from the connection portion can be reduced for all of the pixels, and a domain can be prevented at an end of the connection portions, as in the first embodiment.

INDUSTRIAL APPLICABILITY

When the display device according to the present invention is used for the interface of a mobile device, such as a cellular phone or a digital camera, highly bright image display with excellent outdoor visibility can be achieved.

The invention claimed is:

1. A liquid crystal display device, comprising a liquid crystal panel made of a first substrate, a second substrate and a liquid crystal layer sandwiched between said first substrate and said second substrate, wherein the liquid crystal panel has a first polarizer and a second polarizer on the top and at the bottom; the liquid crystal panel has a number of pixels which can be controlled independently; each pixel has a pair of electrodes, a pixel electrode and a common electrode, in a display portion on the surface of the second substrate close to the liquid crystal layer; the pixel electrode and the common electrode are layered on top of each other with an insulating layer in between; either the pixel electrode or the common electrode further away from the liquid crystal layer is provided as a portion of an electrode sheet in a plane; and the liquid crystal layer is driven by applying an electrical field of which a main component is parallel to the liquid crystal plane, and wherein either the pixel electrode or the common electrode which is close to the liquid crystal layer has a comb-like structure where a linking portion is provided only on one side in a plane, an end portion of the comb-like structure has an end portion structure for preventing a domain from growing, the width of the slits in the comb-like structure is greater than the width of the electrodes, a liquid crystal material of the liquid crystal layer has a positive dielectric anisotropy, and the alignment in the liquid crystal layer is horizontal in an initial state and has such a pretilt angle that the liquid crystal rises from the end portions in the comb-like structure towards the root in the interface close to the electrodes; and the spray elastic constant of the liquid crystal layer is k11 and the twist elastic constant is k22, and k11/k22 is 2 or greater and 3.1 or less.

2. The liquid crystal display device according to claim 1, wherein the sum of the width of the comb-like structure and the width of the slits is 3 μm or greater and 8.5 μm or less.

3. The liquid crystal display device according to claim 1, wherein the value gained by dividing the width of the comb-like structure by the sum of the width of the slits and the width of the comb-like structure is 0.3 or greater and 0.45 or less.

4. The liquid crystal display device according to claim 1, wherein the spray elastic constant of the liquid crystal layer is k11, and k11 is 10 pN or greater and 15.5 pN or less.

5. The liquid crystal display device according to claim 1, wherein either the pixel electrode or the common electrode which is close to the liquid crystal layer has such a structure as to inscribe a trapezoid in a plane where a linking portion is provided either on the bottom side or the top side of the trapezoid so that the two types of structures are arranged alternately.

6. The liquid crystal display device comprising a liquid crystal panel made of a first substrate, a second substrate and a liquid crystal layer sandwiched between said first substrate and said second substrate, wherein the liquid crystal panel has a first polarizer and a second polarizer on the top and at the bottom; the liquid crystal panel has a number of pixels which can be controlled independently; each pixel has a pair of electrodes, a pixel electrode and a common electrode, in a display portion on the surface of the second substrate close to the liquid crystal layer; the pixel electrode and the common electrode are layered on top of each other with an insulating layer in between; either the pixel electrode or the common electrode further away from the liquid crystal layer is provided as a portion of an electrode sheet in a plane; and the liquid crystal layer is driven by applying an electrical field of which a main component is parallel to the liquid crystal plane, and wherein either the pixel electrode or the common electrode which is close to the liquid crystal layer has a comb-like structure where a linking portion is provided only on one side in a plane, an end portion of the comb-like structure has an end portion structure for preventing a domain from growing, the width of the slits in the comb-like structure is greater than the width of the electrodes, a liquid crystal material of the liquid crystal layer has a positive dielectric anisotropy, the alignment in the liquid crystal layer is horizontal in an initial state and has such a pretilt angle that the liquid crystal rises from the end portions in the comb-like structure towards the root in the interface close to the electrodes;

the end portion structure is such a structure that the direction of the slits inclines relative to the comb-like structure at the center of the pixels; and a fringe electric field is generated by the pixel electrode and the common electrode, and an angle between a direction of the liquid crystal alignment in the initial state and a direction of the fringe electric field at the end portion structure is lower than an angle between the direction of the liquid crystal alignment in the initial state and a direction of the fringe electric field at the center of the pixel.

7. The liquid crystal display device according to claim 6, wherein the sum of the width of the comb-like structure and the width of the slits is 3 µm or greater and 8.5 µm or less.

8. The liquid crystal display device according to claim 6, wherein the value gained by dividing the width of the comb-like structure by the sum of the width of the slits and the width of the comb-like structure is 0.3 or greater and 0.45 or less.

9. The liquid crystal display device according to claim 6, wherein the spray elastic constant of the liquid crystal layer is k11, and k11 is 10 pN or greater and 15.5 pN or less.

10. The liquid crystal display device according to claim 6, wherein the spray elastic constant of the liquid crystal layer is k11 and the twist elastic constant is k22, and k11/k22 is 2 or greater and 3.1 or less.

11. The liquid crystal display device according to claim 6, wherein either the pixel electrode or the common electrode which is close to the liquid crystal layer has such a structure as to inscribe a trapezoid in a plane where a linking a portion is provided either on the bottom side or the top side of the trapezoid so that the two types of structures are arranged alternately.

12. The liquid crystal display device comprising a liquid crystal panel made of a first substrate, a second substrate and a liquid crystal layer sandwiched between said first substrate and said second substrate, wherein the liquid crystal panel has a first polarizer and a second polarizer on the top and at the bottom; the liquid crystal panel has a number of pixels which can be controlled independently; each pixel has a pair of electrodes, a pixel electrode and a common electrode, in a display portion on the surface of the second substrate close to the liquid crystal layer; the pixel electrode and the common electrode are layered on top of each other with an insulating layer in between; either the pixel electrode or the common electrode further away from the liquid crystal layer is provided as a portion of an electrode sheet in a plane; and the liquid crystal layer is driven by applying an electrical field of which a main component is parallel to the liquid crystal plane, and wherein either the pixel electrode or the common electrode which is close to the liquid crystal layer has a comb-like structure where a linking portion is provided only on one side in a plane, an end portion of the comb-like structure has an end portion structure for preventing a domain from growing, the width of the slits in the comb-like structure is greater than the width of the electrodes, a liquid crystal material of the liquid crystal layer has a positive dielectric anisotropy, and the alignment in the liquid crystal layer is horizontal in an initial state and has such a pretilt angle that the liquid crystal rises from the end portions in the comb-like structure towards the root in the interface close to the electrodes;

the end portion structure is such a structure that a triangle is added to the end portion of the comb-like structure; and an angle between a direction of the liquid crystal alignment in the initial state and a direction of slits formed in the comb-like structure at the end portion structure is larger than an angle between the direction of the liquid crystal alignment in the initial state and a direction of slits formed in the comb-like structure at the center of the pixel.

13. The liquid crystal display device according to claim 12, wherein the sum of the width of the comb-like structure and the width of the slits is 3 µm or greater and 8.5 µm or less.

14. The liquid crystal display device according to claim 12, wherein the value gained by dividing the width of the comb-like structure by the sum of the width of the slits and the width of the comb-like structure is 0.3 or greater and 0.45 or less.

15. The liquid crystal display device according to claim 12, wherein the spray elastic constant of the liquid crystal layer is k11, and k11 is 10 pN or greater and 15.5 pN or less.

16. The liquid crystal display device according to claim 12, wherein the spray elastic constant of the liquid crystal layer is k11 and the twist elastic constant is k22, and k11/k22 is 2 or greater and 3.1 or less.

17. The liquid crystal display device according to claim 12, wherein either the pixel electrode or the common electrode which is close to the liquid crystal layer has such a structure as to inscribe a trapezoid in a plane where a linking portion is provided either on the bottom side or the top side of the trapezoid so that the two types of structures are arranged alternately.

* * * * *